(12) United States Patent
Sato

(10) Patent No.: US 9,185,130 B2
(45) Date of Patent: Nov. 10, 2015

(54) TRANSMISSION APPARATUS, RECEPTION APPARATUS, COMMUNICATION SYSTEM, TRANSMISSION METHOD, AND RECEPTION METHOD

(71) Applicant: Panasonic Corporation, Osaka (JP)

(72) Inventor: Tetsuro Sato, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 73 days.

(21) Appl. No.: 14/131,959

(22) PCT Filed: Apr. 15, 2013

(86) PCT No.: PCT/JP2013/002548
§ 371 (c)(1),
(2) Date: Jan. 10, 2014

(87) PCT Pub. No.: WO2013/179551
PCT Pub. Date: Dec. 5, 2013

(65) Prior Publication Data
US 2014/0201523 A1      Jul. 17, 2014

(30) Foreign Application Priority Data

May 29, 2012    (JP) ................................. 2012-122363

(51) Int. Cl.
*H04L 29/06* (2006.01)
*H04L 9/36* (2006.01)
*H04N 21/2347* (2011.01)

(52) U.S. Cl.
CPC .............. *H04L 63/1458* (2013.01); *H04L 9/36* (2013.01); *H04L 63/0428* (2013.01); *H04L 63/162* (2013.01); *H04L 63/164* (2013.01); *H04N 21/23476* (2013.01)

(58) Field of Classification Search
CPC ... H04L 9/36; H04L 63/0428; H04L 63/1458; H04L 63/162; H04L 63/164; H04N 21/23476
USPC ......................................................... 713/161
See application file for complete search history.

(56) References Cited

U.S. PATENT DOCUMENTS 7,155,011 B2 * 12/2006 Ueda et al. ...................... 380/37
2004/0193871 A1    9/2004 Seshadri
(Continued)

FOREIGN PATENT DOCUMENTS

JP    2008-034939 A    2/2008
JP    2008-067102 A    3/2008
(Continued)

OTHER PUBLICATIONS

Akihiro, Kameda. Fukuda, Isamu. "Communication Device, Communication Method and Communication System". Dec. 1, 2012. Japan. Publication No. 2012-010254.*
(Continued)

*Primary Examiner* — Kambiz Zand
*Assistant Examiner* — Aubrey Wyszynski
(74) *Attorney, Agent, or Firm* — Pearne & Gordon LLP

(57) ABSTRACT

Provided is a transmission apparatus capable of avoiding unnecessary decryption and preventing a denial-of-service attack. The transmission apparatus that establishes a secure communications channel (SA) between the transmission apparatus and a reception apparatus includes a creation section that creates a packet, an encryption section that, based on a ratio of a redundant packet to the packets created by the packet creation section and on an instruction from the reception apparatus, determines an encryption coverage in the created packet and encrypts data in the encryption coverage, and a transmission section that transmits the encrypted packet through SA.

16 Claims, 33 Drawing Sheets

(56) References Cited

U.S. PATENT DOCUMENTS

| | | | |
|---|---|---|---|
| 2011/0064031 A1* | 3/2011 | Elmasry | 370/328 |
| 2012/0020475 A1 | 1/2012 | Altmann | |
| 2012/0331556 A1* | 12/2012 | Alperovitch et al. | 726/23 |
| 2013/0103940 A1* | 4/2013 | Badea | 713/160 |

FOREIGN PATENT DOCUMENTS

| | | |
|---|---|---|
| JP | 2012-010254 A | 1/2012 |
| JP | 2013-015605 A | 1/2013 |

OTHER PUBLICATIONS

International Search Report for PCT/JP2013/002548 dated Jun. 25, 2013.
S. Kent, Networking Working Group, BBN Technologies, Dec. 2005, "IP Encapsulating Security Payload (ESP)".
M. Baugher, et al., Networking Working Group, Cisco Systems, Inc., Mar. 2004, "The Secure Real-Time Transport Protocol (SRTP)".
Extended European Search Report for Application No. 13797957.1-1870/2858300 dated May 29, 2015.

* cited by examiner

*FIG. 10*

| 1 | ICMP | INTERNET CONTROL MESSAGE |
|---|---|---|
| 4 | IP | IP IN IP (ENCAPSULATION) |
| 6 | TCP | TRANSMISSION CONTROL |
| 17 | UDP | USER DATAGRAM |
| 41 | IPv6 | IPv6 |
| 44 | IPv6-Frag | FRAGMENT HEADER FOR IPv6 |
| 50 | ESP | ENCAP SECURITY PAYLOAD |
| 51 | AH | AUTHENTICATION HEADER |
| 58 | IPv6-ICMP | ICMP FOR IPv6 |
| 59 | IPv6-NoNxt | NO NEXT HEADER FOR IPv6 |
| 60 | IPv6-Opts | DESTINATION OPTIONS FOR IPv6 |
| 94 | IPIP | IP-WITHIN-IP ENCAPSULATION PROTOCOL |

TRANSPORT MODE·DATA PORTION DECRYPTION

TUNNEL MODE·DATA PORTION ENCRYPTION

TUNNEL MODE-DATA PORTION DECRYPTION

TRANSPORT MODE·DATA PORTION DECRYPTION

TRANSMISSION APPARATUS, RECEPTION APPARATUS, COMMUNICATION SYSTEM, TRANSMISSION METHOD, AND RECEPTION METHOD

TECHNICAL FIELD

The present disclosure relates to a transmission apparatus, a reception apparatus, a communication system, a transmission method, and a reception method.

BACKGROUND ART

As a method that realizes secure communications over the Internet, a security architecture for Internet protocol (IPsec) is in wide use.

With regard to encryption using IPsec, an encapsulating security payload (ESP) method is disclosed in NPL 1.

Furthermore, as a method that realizes other secure communication, a secure real-time transport protocol (SRTP) is disclosed in NFL 2. SRTP is an encryption method that results from standardizing a real-time transport protocol (RTP).

Furthermore, in PTL 1 is disclosed a method in which a coverage in which the encryption is performed is adjusted in advance between a transmitting entity and a receiving entity and only one region of a packet that is designated is encrypted.

CITATION LIST

Patent Literature

[PTL 1] JP-A-2012-010254

Non Patent Literature

[NPL 1] "IP Encapsulating Security Payload (ESP)", IETF, RFC4303
[NPL 2] "The Secure Real-time Transport Protocol (STRP)," IETF, RFC3711

SUMMARY OF INVENTION

Technical Problem

In the related art, it is difficult to avoid unnecessary decryption and prevent a denial-of-service attack.

An object of the present disclosure is to provide a transmission apparatus, a reception apparatus, a communication system, a transmission method, and a reception method that are capable of avoiding unnecessary decryption and preventing a denial-of-service attack.

Solution to Problem

A transmission apparatus configured to establish a secure communications channel between the transmission apparatus and a reception apparatus, comprising;
 a packet creation section configured to create a packet;
 an encryption section configured to, based on a ratio of redundant packets to the packets created by the packet creation section or on an instruction from the reception apparatus, determine an encryption coverage in the packet created by the packet creation section and encrypt data in the encryption coverage; and
 a transmission section configured to transmit the packet encrypted by the encryption section through the secure communications channel.

Advantageous Effects of Invention

The disclosure can avoid the unnecessary encryption and prevent the denial-of-service attack.

BRIEF DESCRIPTION OF DRAWINGS

FIG. 10 is a diagram illustrating a relationship between a protocol and a protocol number.

DESCRIPTION OF EMBODIMENTS

Figure 1:
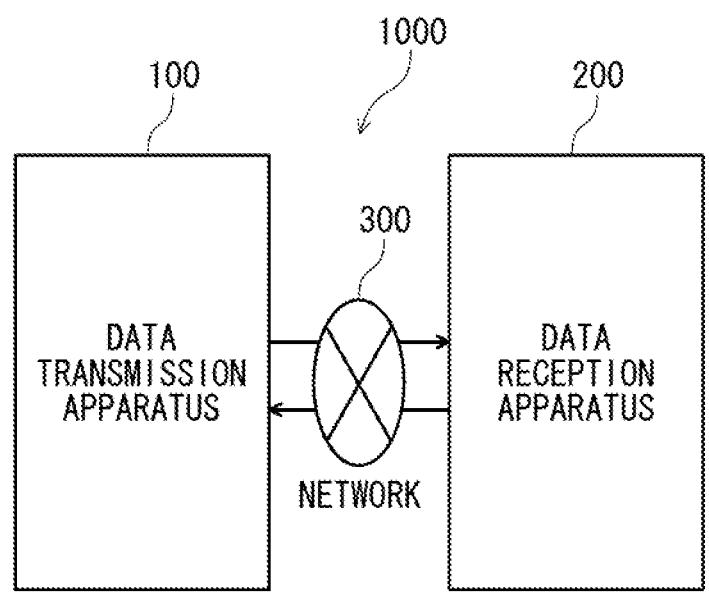
FIG. 1 is a block diagram illustrating a configuration example of a data communication system including a data transmission apparatus and a data reception apparatus according to first to third embodiments.

Embodiments of the present disclosure are described below referring to the accompanying drawings.

(Background and Development History of an Embodiment According to the Present Disclosure)

A region (an encryption coverage) that is encrypted in accordance with a change in a network situation cannot be changed with a method in the related art.

In IPsec, the region from a UDP header or a TCP header to application data is encrypted, and the coverage in which encryption is performed is fixed.

Furthermore, in SRTP, the application data is encrypted, and the UDP header or an RTP header is not encrypted.

Furthermore, the region in which the encryption is performed has to be determined in advance in the technology disclosed in PTL 1.

In the case of IPsec, because the encryption is performed with a header portion included, resistance to a malicious denial-of-service attack (DoS attack) is strong. The denial-of-service attack (DoS attack), for example, includes a TCP SYN flooding attack, a UDP flooding attack, an ICMP flooding attack, or a TCP connection flooding attack. In the case of IPsec, it is possible to perform a filtering setting, which allows receiving of only ESP, against DoS Attack, and damage due to the DoS attack can be reduced.

If each header (including the UDP header or the TCP header) is not encrypted, there is a high likelihood of suffering the damage due to the DoS attack. That is, if the header is not encrypted, a port number of a packet that flows through an internetwork is illegally intercepted and read and thus there is a risk that an attacker will launch the DoS attack using the port number designated. When the DoS attack is present, for example, a resource of a CPU or memory is consumed. Therefore, because processing by a reception apparatus becomes slow or the reception apparatus stops, this causes an obstacle to providing a service.

On the other hand, if each header is encrypted, there is a need to decrypt a reception packet on the reception side. In this case, unnecessary decryption is performed. For example, when receiving image-voice data, to protect against a packet loss that occurs in a network, data is transmitted in an overlapping manner, such as doubly and triply, or is transmitted along with a redundant packet in such a manner that a loss packet can be restored. The redundant packet for restoring the loss packet, for example, is for forward error correction (FEC).

Furthermore, as a method of increasing loss tolerance of the packet, redundancy is considered to be dynamically adjusted in accordance with the network situation. In other words, if the network situation is satisfactory, transmission is considered to be performed with decreased redundancy. If the network situation is poor, the transmission is considered to be performed with increased redundancy. The transmission of the redundant packet with increased redundancy includes transmission of an inspection packet like FEC and overlapping packet transmission in which same data is repeatedly transmitted a number of multiple times. In such a case, on the reception side, unnecessary data or the same data is received many times.

However, if the region including the header is encrypted, when the packet is not decrypted, it cannot be recognized whether or not the redundant packet is present. In other words, after performing the processing, it is determined that the performed decryption is unnecessary.

The decryption is processing that puts a great load on the CPU in the same manner as the encryption, and for example, has an effect on power consumption or battery life. Therefore, it is preferable that the unnecessary decryption be avoided in advance.

The unnecessary decryption, for example, occurs because each header for example, including the UDP header, the TCP header, or an application header at a layer above it) is encrypted. If each header is not encrypted, whether the redundant packet is present can be recognized easily by simple checking and, for example, ESP decryption that puts a burden on CPU can be omitted.

In this manner, if each header is not encrypted, there is a likelihood that the DoS attack will cause the obstacle to providing the service. Conversely, if each header is encrypted, there is a likelihood that the unnecessary decryption will have to be performed.

A transmission apparatus, a reception apparatus, a communication system, a transmission method, and a reception method are described below that can avoid the unnecessary encryption and prevent the denial-of-service attack.

As illustrated in FIG. 1, in a data communication system 1000, a data transmission apparatus 100 and a data reception apparatus 200 are connected to each other through a network 300.

(Encryption Method)

According to the embodiments of the present disclosure, the data transmission apparatus 100 performs packet encryption and data portion encryption. The data reception apparatus 200 performs packet decryption and data portion decryption. The packet decryption is performed to decrypt packet-encrypted data. The data portion decryption is performed to decrypt data-portion-encrypted data.

The packet encryption is one example of first encryption in which substantially an entirety of a created packet is encrypted. IPsec is used in encrypting the packet. In encrypting the packet, the headers are processed, beginning with the header in the front of the packet. An ESP header is processed, and data (for example, image data or voice data) is decrypted.

The data portion encryption is one example of second encryption in which a data portion (for example, including the application data) that is included in the created packet is encrypted.

A secure communications channel is established between the data transmission apparatus 100 and the data reception apparatus 200 before starting data communication. The secure communications channel includes a security association (SA). Two SAs may be individually established, one for encrypting the packet and the other for encrypting the data portion. One SA may be established in common.

The security association (SA) is, for example, a set of information including an encryption method, an encryption key head, an authentication method, an authentication key head, or key data. The encryption key head and the authentication key head are expressed in, for example, bit length. The encryption method includes, for example, a data encryption standard (DES), a 3DES, or an advanced encryption standard (AES). The authentication method includes, for example, a message digest (MD) 5, a secure hash algorithm (SHA)-1, an SHA-2, or a message authentication code (MAC).

The data transmission apparatus 100 and the data reception apparatus 200 share the SA in advance in order to encrypt the packet or the data portion. By sharing SA in advance, the data reception apparatus 200 can correctly perform the decryption even though the data transmission apparatus 100 performs the data portion encryption and performs the packet encryption. Moreover, the data reception apparatus 200 can correctly perform the decryption even though the packet on which to perform the data portion encryption and the packet on which to perform the packet encryption are mixed.

Therefore, if the data reception apparatus 200 gives an instruction for switching to the data portion encryption or the packet encryption, the decryption can be correctly performed even though the packet decrypted before switching arrives during a period from the time when the data reception apparatus 200 gives the instruction to the time when the data transmission apparatus 100 performs the switching.

Furthermore, even though the switching instruction does not arrive at the data transmission apparatus 100, or even though the data transmission apparatus 100 does not follow the switching instruction, the data reception apparatus 200 can correctly perform the decryption.

(Switching of the Encryption Method)

Figure 29:
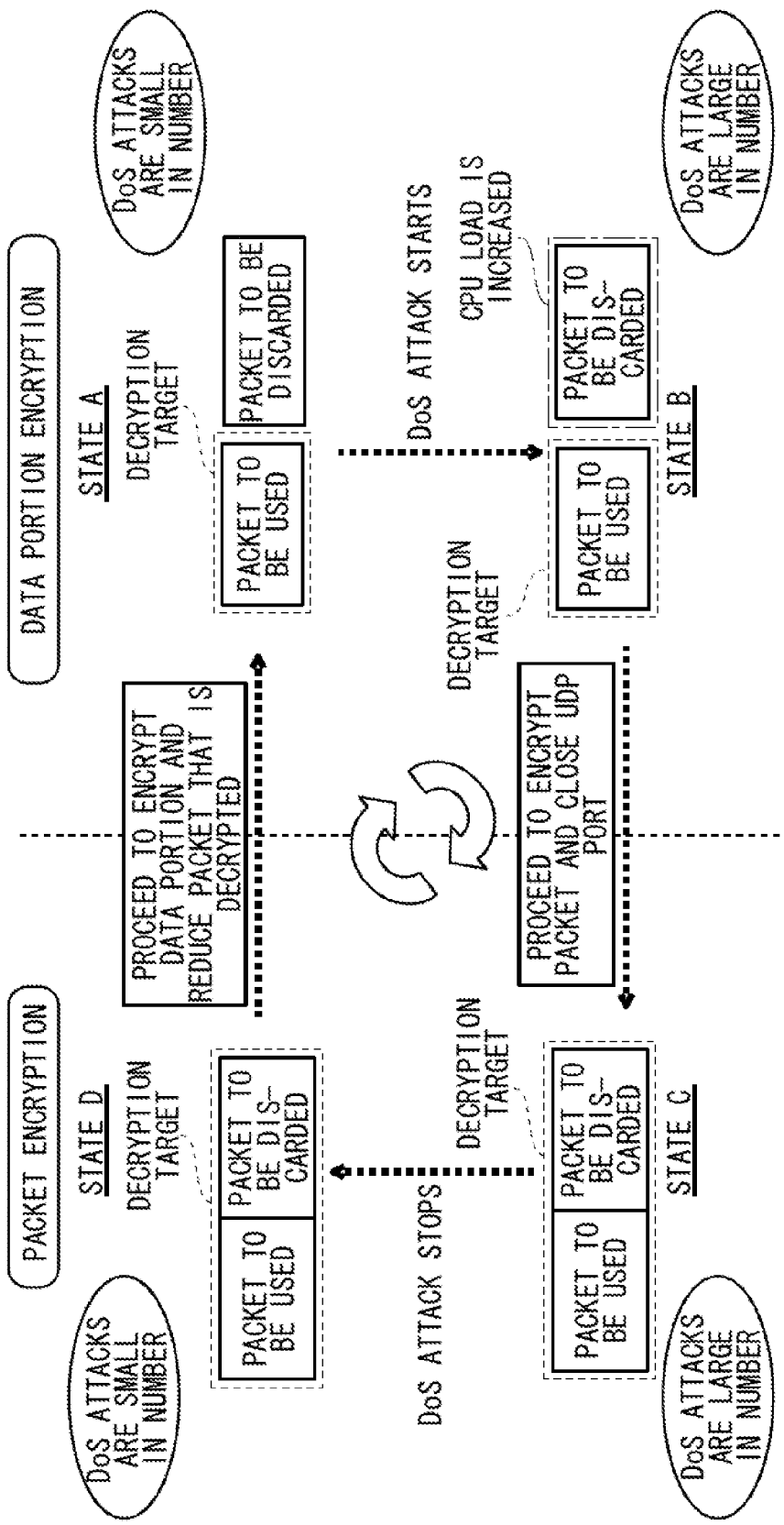
FIG. 29 is a diagram illustrating an example of switching an encryption method according to the first to third embodiments.

Next, an outline of the switching of the encryption method is described referring to FIG. 29.

When the DoS attack starts, in the data reception apparatus 200, in a state where the data portion encryption is performed by the data transmission apparatus 100, the number of times of detection of packet discarding is increased (state A→state B). If the packet discarding exceeds a predetermined value, the data reception apparatus 200 determines this to be the DoS attack and instructs the data transmission apparatus 100 to switch to the packet encryption (state B→state C). The destroyed packet includes, for example, a packet containing TCP, UDP or ICMP.

Accordingly, reduction of a CPU processing load that results from the DoS attack can relatively decrease a CPU load and reduce the power consumption, compared to the reduction of the CPU processing load that results from the redundant packet.

The data reception apparatus 200, for example, can identify a service provided over TCP or UDP using the port number. If the packet addressed to the port number of the provided service is received, the data reception apparatus 200 processes reception data by executing an application program at the receiving side.

When under the DoS attack with a specific port number designated, the data reception apparatus 200 receives a very large number of packets and thus the CPU processing load is increased.

Furthermore, if the data portion encryption is performed, before decrypting the reception packet, the data reception apparatus 200 processes the UDP header or the TCP header and checks authentication data that is added by the data portion encryption. Because the correct authentication data cannot be added to the packet suffering from the DoS attack, the data reception apparatus 200 can determine whether the packet suffering from the DoS attack is present, by checking the authentication data.

If the number of the discarded packets that result from checking the authentication data (result from authentication error) exceeds the predetermined value, the data reception apparatus 200 determines that the DoS attack targeted at the port number at which the service is provided and instructs the data transmission apparatus to switch to the packet encryption (state B→state C).

Accordingly, the reduction of the CPU processing load that results from the DoS attack is possible and this can relatively decrease the CPU load and reduce the power consumption, compared to the reduction of the CPU processing load that results from the redundant packet.

Furthermore, if the data portion encryption is performed, when it is detected that the number of the discarded redundant packets is at the predetermined value or below, the data reception apparatus 200 instructs the data transmission apparatus 100 to switch to the packet encryption (state B→state C).

Accordingly, the resistance to the DoS attack is improved without increasing the number of times of unnecessary decryption too much.

When giving the instruction for switching from the data portion encryption to the packet encryption, the data reception apparatus 200 adds the reason for the switching. The data transmission apparatus 100 does not recognize whether or not the data reception apparatus 200 comes under the DoS attack. Because of this, the data reception apparatus 200 notifies the data transmission apparatus 100 that the data reception apparatus 200 comes under the DoS attack.

On the other hand, before transmitting the packet, the data transmission apparatus 100 can grasp whether or not there are many redundant packets. Because of this, according to its own determination, the data transmission apparatus 100 can make a decision as to whether to perform the data portion encryption or perform the packet encryption.

Accordingly, the reduction of the CPU processing load that results from the DoS attack is possible and this can relatively decrease the CPU load and reduce the power consumption, compared to the reduction of the CPU processing load that results from the redundant packet.

If the packet encryption is performed, when the DoS attack is drawing to an end, the data reception apparatus 200 decreases the number of discardings of each packet (including the packet containing TCP, UDP, or ICMP) (state C→state D). If the number of the discarded packets is below the predetermined value, the data reception apparatus 200 determines that the data reception apparatus 200 does not come under the DoS attack.

Furthermore, the data reception apparatus 200 determines whether or not it comes under the DoS attack, by checking the authentication data that is added by the packet encryption. If the number of the discarded packets that result from checking the authentication data (result from the authentication error) is below the predetermined value, the data reception apparatus 200 determines that it does not come under the DoS attack.

When not under the DoS attack, the data reception apparatus 200 performs the packet decryption and checks for the redundant packet. Furthermore, if the number of the discarded redundant packets exceeds the predetermined value, the data reception apparatus 200 instructs the data transmission apparatus 100 to switch to the data portion encryption (state D→state A).

Accordingly, for example, if the packet that is the same as the already-received redundant data is present, performing the unnecessary decryption can be avoided, the CPU processing load can be decreased, and the power consumption can be reduced.

Moreover, the data reception apparatus 200 may transmit to data transmission apparatus 100 information as to whether or not the data reception apparatus 200 comes under the DoS attack. In this case, the data transmission apparatus 100 may determine whether to perform the data portion encryption or perform the packet encryption, using the information as to whether or not the redundant packets are many or the information as to whether or not the data reception apparatus 200 comes under the DoS attack.

(Configuration of the Communication System)

Next, a configuration example of the data communication system 1000 including the data transmission apparatus 100 and the data reception apparatus 200 is described.

FIG. 1 is a block diagram illustrating the configuration example of the data communication system 1000 including the data transmission apparatus 100 and the data reception apparatus 200 according to each embodiment. The data transmission apparatus 100 and the data reception apparatus 200 are connected through the network 300.

(Configuration of the Data Transmission Apparatus)

Figure 32:
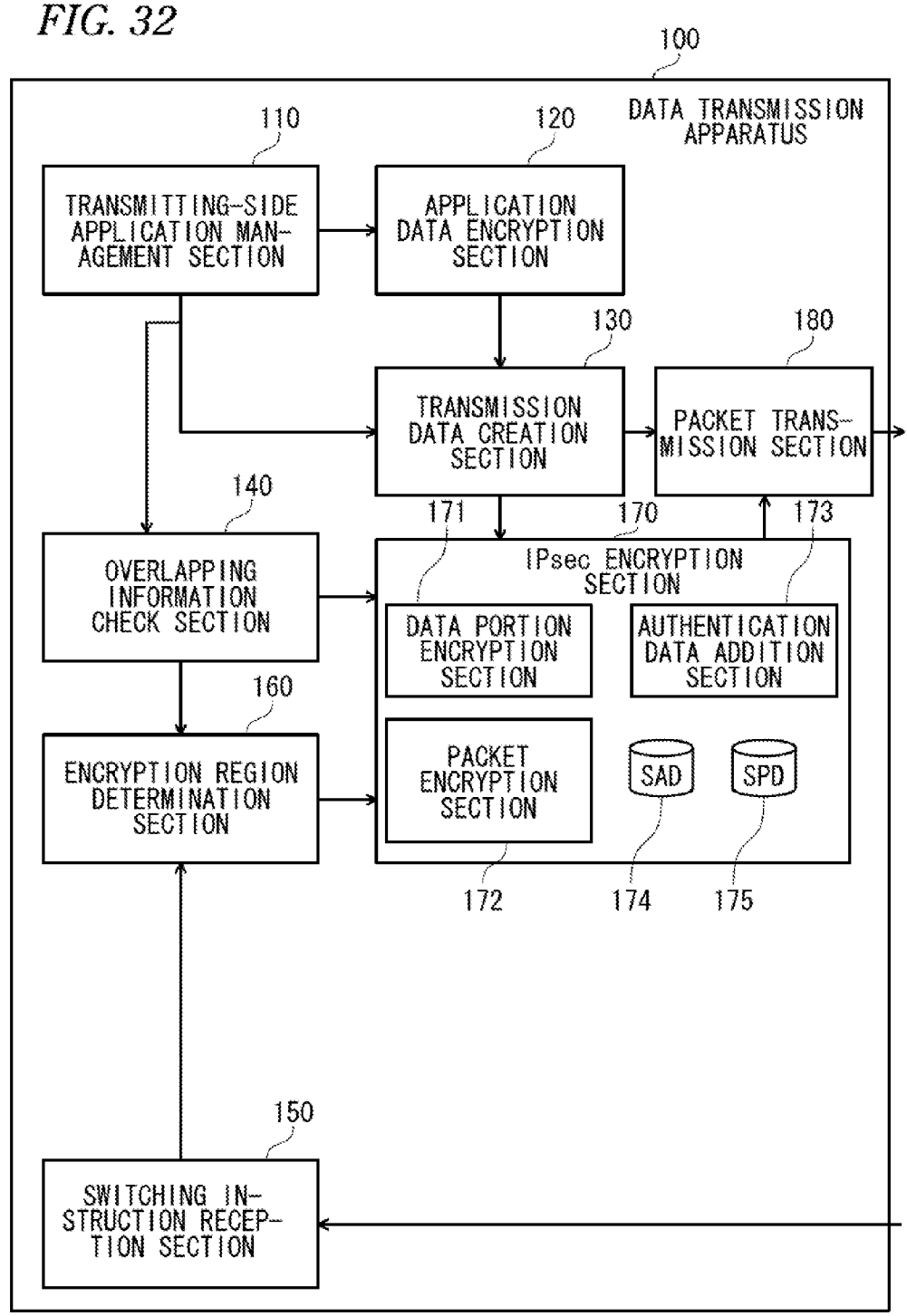
FIG. 32 is a diagram illustrating an internal configuration of the data transmission apparatus according to the first to third embodiments.

A configuration example of the data transmission apparatus 100 is described. FIG. 32 is a block diagram illustrating an internal configuration of the data transmission apparatus 100.

The data transmission apparatus 100 includes a transmitting-side application management section 110, an application data encryption section 120, a transmission data creation section 130, an overlapping information check section 140, a switching instruction reception section 150, and an encryption region determination section 160. Furthermore, the data transmission apparatus 100 includes an IPsec encryption section 170 and a packet transmission section 180.

The IPsec encryption section 170 includes a data portion encryption section 171, a packet encryption section 172, and an authentication data check section 173. Furthermore, the IPsec encryption section 170 includes a security association database (SAD) 174 and a security policy database (SPD) 175.

SAD 174 is a database in which information on SA between a sending entity and a receiving entity is stored. SPD 175 is a database in which information on security policy (SP) between the sending entity and the receiving entity is stored.

The transmitting-side application management section 110 manages a transmitting-side application. Each constituent section of the data transmission apparatus 100 (for example, the transmitting-side application management section 110, the application data encryption section 120, and the IPsec encryption section 170) realizes various functions by executing the transmitting-side application. The transmitting-side application is among software programs.

For example, if the transmitting-side application is an application that handles an image or a voice, the transmitting-side application management section 110 creates image data or voice data by shooting using a camcorder or reads recorded image data or voice data from a medium. Furthermore, for example, if the transmitting-side application is a file transfer application, the transmitting-side application management section 110 reads recorded file data.

The transmission data creation section 130 creates transmission data (for example, an IP packet). The created transmission data, for example, includes RTP data, an RTP header, a UDP header or a TOP header, and an IP header (for example, refer to the uppermost packet in FIG. 5). The RTP data is one example of the application data, and the RTP header is one example of the application header including information unique to an application.

The packet created by the transmission data creation section 130 includes an RTP packet, an FEC packet, a TCP packet, or an application packet.

The IPsec encryption section 170 encrypts the IP packet created by the transmission data creation section 130, using a predetermined encryption method. The data portion encryption section 171 performs the data portion encryption. The packet encryption section 172 performs the packet encryption. The authentication data check section 173 performs authentication using a predetermined authentication method and adds the authentication data to the IP packet that is transmitted.

The IPsec encryption section 170 searches for SPD 175 at the time of the start of communication and checks SP between the sending entity and the receiving entity. SP, for example, includes information that the communication takes place with the encryption being performed, information that the communication takes place with the authentication data being added, or information that the communication takes place with the encryption not being performed. SP can specify and determine a protocol and a port number. Furthermore, even though the receiving entities are identical, SP that varies from application to application may be set.

If the encryption is necessary as a result of checking SP, the IPsec encryption section 170 searches SAD 174 for SA. If SA is not present, the IPsec encryption section 170 performs Internet key exchange (IKE) and establishes SA between the IPsec encryption section 170 and the data reception apparatus 200.

The packet transmission section 180 transmits the packet that is created by the application data encryption section 120, the transmission data creation section 130, or the IPsec encryption section 170.

The overlapping information check section 140 checks whether or not the redundant packet (for example, the inspection packet or the overlapping packet) is created or checks a creation ratio of the redundant packet and notifies the encryption region determination section 160 of the result of checking. For example, the overlapping information check section 140 checks the number of times (the number of times of overlapping) that the data is repeatedly transmitted, whether or not the inspection packet is created by FEC, or information including the creation ratio of the inspection packet.

The switching instruction reception section 150 receives information from the data reception apparatus 200 and notifies the encryption region determination section 160 of the information. The information from the data reception apparatus 200, for example, includes the instruction for switching to the data portion encryption, the instruction for switching to the packet encryption, or the information as to whether the data reception apparatus 200 comes under the DoS attack.

The encryption region determination section 160 determines whether to perform the data portion encryption or perform the packet encryption, using information on the redundant packet from the overlapping information check section 140 and information from the data reception apparatus 200 and gives an instruction to the IPsec encryption section 170.

The application data encryption section 120 receives the application data (for example, the image data or the voice data) from the transmitting-side application management section 110. Furthermore, the application data encryption section 120 encrypts the received data using the encryption method unique to an application and outputs the encrypted data to the transmission data creation section 130. The application data encryption section 120 is used mainly in a third embodiment.

(Configuration of the Data Reception Apparatus)

Figure 33:
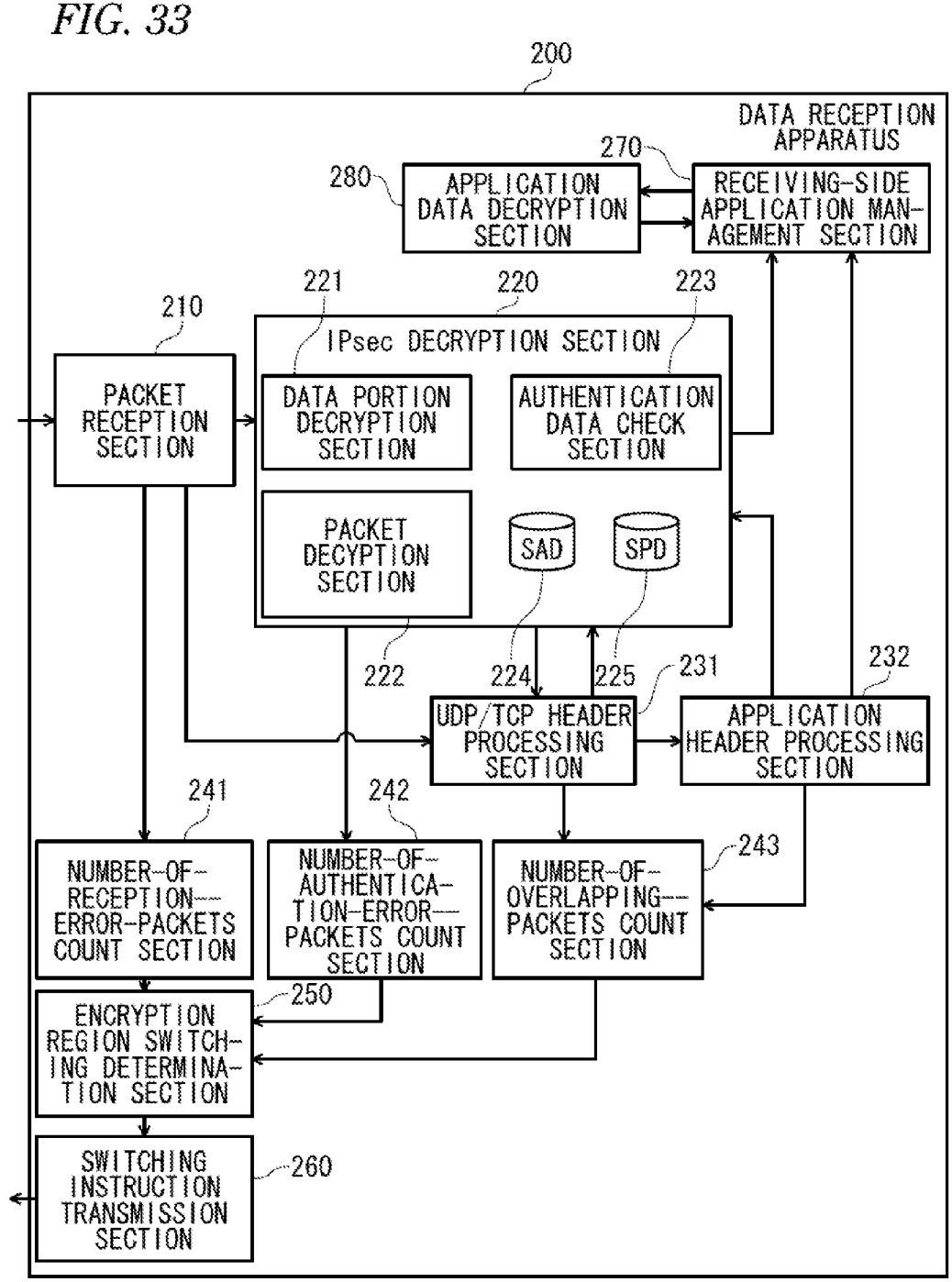
FIG. 33 is a diagram illustrating an internal configuration of the data reception apparatus according to the first to third embodiments.

A configuration example of the data reception apparatus 200 is described. FIG. 33 is a block diagram illustrating an internal configuration of the data reception apparatus 200.

The data reception apparatus 200 includes a packet reception section 210, an IPsec decryption section 220, a UDP/TCP header processing section 231, and an application header processing section 232. Furthermore, the data reception apparatus 200 includes a number-of-reception-error-packets count section 241, a number-of-authentication-error-packets count section 242, and a number-of-overlapping-packets count section 243. Furthermore, the data reception apparatus 200 includes an encryption region switching determination section 250, a switching instruction transmission section 260, a receiving-side application management section 270, and an application data decryption section 280.

The IPsec decryption section 220 includes a data portion decryption section 221, a packet decryption section 222, an authentication data check section 223, SAD 224, and SPD 225.

The receiving-side application management section 270 manages a receiving-side application. Each constituent element of the data reception apparatus 200 (for example, the IPsec decryption section 220, the receiving-side application management section 270, and the application data decryption section 280) realizes various functions by executing the receiving-side application. The receiving-side application is among software programs.

For example, if the receiving-side application is an application that handles an image or a voice, the receiving-side application management section 270 reproduces the image data or the voice data. Furthermore, for example, if the reception-side application is a file transfer application, the receiving-side application management section 270 creates a file using received file data and retains the created file.

The application data decryption section 280 decrypts the application data (for example, the RTP data) using a decryption method unique to the application and performs the decryption. The application data decryption section 280 is used mainly in the third embodiment.

The packet reception section 210 receives the packet transmitted from the data transmission apparatus 100. If the reception packet is encrypted, the packet reception section 210 delivers the reception packet to the IPsec decryption section 220. In the reception packet, if the UDP header or the TCP header is added and the UDP header or the TCP header is not encrypted, delivery to the UDP/TCP header processing section 231 takes place.

Furthermore, when receiving the corrupt packet and discarding the packet, the packet reception section 210 notifies the number-of-reception-error-packets count section 241 of the packet discarding information. For example, in a state where filtering is set in such a manner that only the ESP-encrypted packet is received, when receiving a predetermined packet, the packet reception section 210 discards the packet and provides notification of the discarding information. The predetermined packet, for example, includes a UDP packet, a TCP packet, or an ICMP packet.

The IPsec decryption section 220 decrypts the reception packet using a predetermined decryption method. The data portion decryption section 221 decrypts the data-portion-encrypted packet (the data portion decryption). The packet decryption section 222 decrypts the packet on which the packet encryption is performed (the packet decryption). Furthermore, the authentication data check section 223 checks the authentication data. SAD 224 is the same as SAD 174. SPD 225 is the same as SPD 175. The IPsec decryption section 220 performs the decryption using the information on SA that is retained by SAD 224.

The UDP/TCP header processing section 231 performs UDP header processing of the reception packet or TCP header processing of the reception packet. In processing the header, necessary information is extracted from among items of information included in the header. If the data portion encryption is performed on the reception packet, the UDP header or the TOP header is processed and thereafter the data portion decryption is performed. If the packet encryption is performed on the reception packet, the packet decryption is first performed and the UDP header or the TOP header on which the decryption is performed is processed.

Furthermore, the UDP/TCP header processing section 231 discards an unnecessary header among the UDP headers or the TOP packets that are included in the redundant packets. For example, the UDP/TCP header processing section 231 checks a status of discarding the overlapping packet of TOP. For example, if a "Sequence Number" included in the header, which is referred to, is a predetermined value or falls within a predetermined range, the UDP/TCP header processing section 231 determines that the overlapping data is present.

The application header processing section 232 performs the header processing that varies from application to application. If the data portion encryption is performed on the reception packet, the application header is processed and thereafter, the data portion encryption is performed. If the packet encryption is performed on the reception packet, the data portion encryption is performed and the application header on which the decryption is performed is processed. The application header processing section 232 discards the unnecessary header among the application headers that are included in the redundant packets.

For example, the application header processing section 232 checks whether or not a same packet (the overlapping packet) is repeatedly transmitted in the application. For example, if the sequence number is a predetermined value or falls within a predetermined range, the application header processing section 232 determines that the overlapping packet is present, referring to the "Sequence Number" included in the header.

Furthermore, the application header processing section 232 also checks a status of discarding of the inspection packet that results from FEC. For example, if the network situation is satisfactory, the application header processing section 232 discards an FEC packet that does not need data restoration.

The number-of-reception-error-packets count section 241 receives the information on the packet in which a reception error occurs from the packet reception section 210 and counts (computes) the number of reception error packets. Furthermore, the number-of-reception-error-packets count section 241 determines whether or not the DoS attack is present. If the number of reception error packets, for example, is a predetermined value or above, the number-of-reception-error-packets count section 241 determines that the DoS attack is present. The number-of-reception-error-packets count section 241 notifies the encryption region switching determination section 250 of the information related to the presence and the absence of the DoS attack. Moreover, instead of the number of reception error packets, for example, the presence or the absence of the DoS attack may be determined according to a ratio of the number of the reception error packets to the total number of the reception packets.

The number-of-authentication-error-packets count section 242 receives the information on the packet in which the authentication error occurs from the IPsec decryption section 220 and counts (computes) the number of authentication error packets. Furthermore, the number-of-authentication-error-packets count section 242 determines that the DoS attack is present. If the number of authentication error packets, for example, is a predetermined number or greater, the number-of-authentication-error-packets count section 242 determines that the DoS attack is present. The number-of-authentication-error-packets count section 242 notifies the encryption region switching determination section 250 of the information on the presence and the absence of the DoS attack. Moreover, instead of the number of authentication error packets, for example, the presence or the absence of the DoS attack may be determined according to a ratio of the number of the authentication error packets to the total number of the reception packets.

The number-of-overlapping-packets count section 243 receives information on the discarding of the redundant packet from the UDP/TCP header processing section 231 or the application header processing section 232, and counts (computes) the number of discarded redundant packets (the number of the redundant packets). The encryption region switching determination section 250 is notified of the information related to the presence or the absence of the discarded redundant packet.

The encryption region switching determination section 250 receives the information on the presence and absence of the DoS attack or the information on the discarding of the redundant packet from the number-of-reception-error-packets count section 241, the number-of-authentication-error-packets count section 242 and the number-of-overlapping-packets count section 243.

For example, if the packet discarding of the redundant packet almost does not occur (is at the predetermined value or below), the encryption region switching determination section 250 selects the packet encryption. Accordingly, the data communication can take place more safely without changing the network load and the CPU processing load too much.

Furthermore, for example, if the packet discarding that results from the redundant packet occurs and the DoS attack has not occurred, the encryption region switching determination section 250 selects the data portion encryption. Accordingly, the network load and the CPU processing load that results from the redundant packet can be reduced.

The encryption region switching determination section 250 notifies the switching instruction transmission section 260 of determination information (encryption selection information) as to which of the packet encryption and the data portion encryption to select.

The switching instruction transmission section 260 notifies the data transmission apparatus 100 of information on the encryption selection. The information on the encryption selection, for example, includes switching information for performing the packet encryption or switching information for performing the data portion encryption.

(Outline of Operation)

Figure 30:
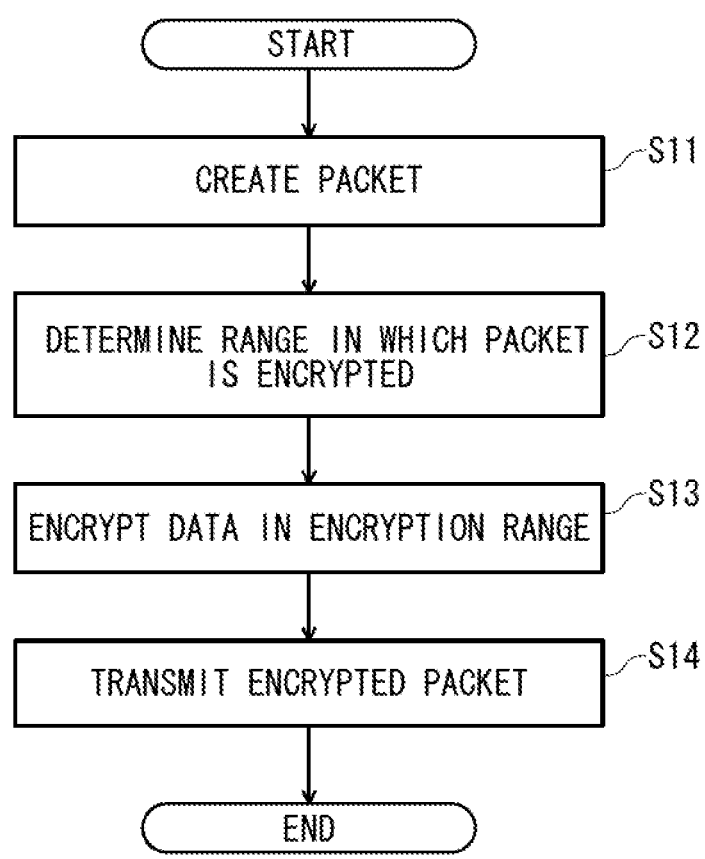
FIG. 30 is a flow chart illustrating an outline of an operational example of the data transmission apparatus according to the first to third embodiments.

Next, an operational example of the data transmission apparatus 100 is described referring to FIG. 30.

The secure communications channel is established between the data transmission apparatus 100 and the data reception apparatus 200.

First, a packet creation section creates the packet (for example, the IP packet) (Step S11). The packet creation section, for example, is the transmission data creation section 130.

Subsequently, an encryption section determines the encryption coverage (the encryption region) of the created packet (Step S12) and encrypts the data in the encryption coverage (Step S13), based on a ratio of the redundant packets to the packets created by the packet creation section and on the instruction from the reception apparatus. The encryption section is, for example, the encryption region determination section 160 and the IPsec encryption section 170.

Subsequently, a transmission section transmits the packet on which the encryption is performed by the encryption section through the secure communications channel (Step S14). The transmission section is, for example, the packet transmission section 180.

Figure 31:
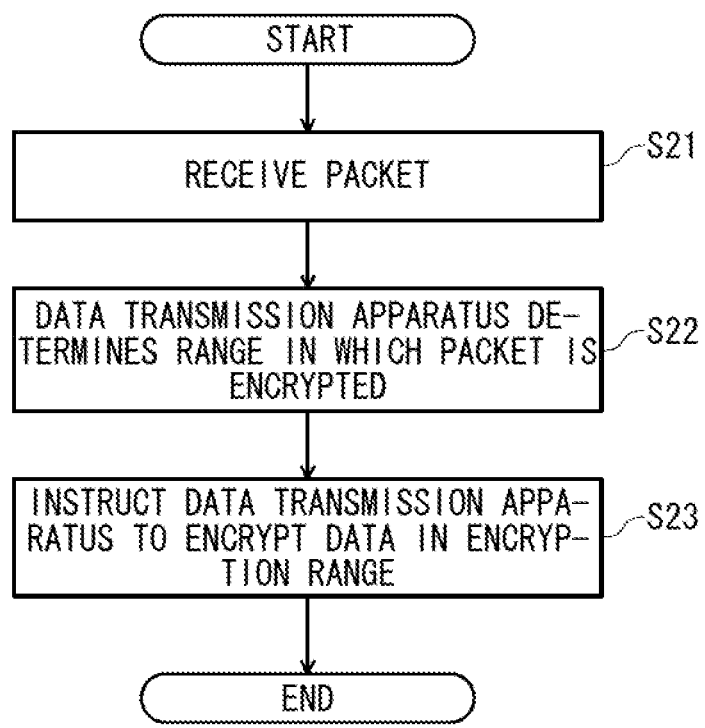
FIG. 31 is a flow chart illustrating an outline of an operational example of the data reception apparatus according to the first to third embodiments.

Next, an operational example of the data reception apparatus 200 is described in an outline referring to FIG. 31.

The secure communications channel is established between the data transmission apparatus 100 and the data reception apparatus 200.

First, a reception section receives the packet through the secure communications channel (Step S21). The reception section is, for example, the packet reception section 210.

Subsequently, the encryption instruction section determines the encryption coverage in which the packet created by the data transmission apparatus 100 is encrypted, according to whether or not the packet received by the reception section satisfies a predetermined reference (Step S22). Furthermore, the encryption instruction section instructs the data transmission apparatus 100 to encrypt the data in the encryption coverage (Step S23). The encryption instruction section is, for example, the IPsec decryption section 220.

In the embodiments of the present disclosure, it is assumed that there are three types of processing as the data portion encryption. The three types of processing are described according to first to third embodiments, respectively. Moreover, the packet encryption is the same for first to third embodiments.

Furthermore, in each embodiment, as a main example, an RTP as an application is included in the packet. Furthermore, as a main example, the UDP packet is included in the packet. Furthermore, as a main example, the overlapping packet as the redundant packet is included in the packet.

First Embodiment

The data portion encryption in the present embodiment, an ESP header is arranged immediately in front of an ESP data. Furthermore, the UDP header and the RTP header, without being encrypted, are arranged in front of the ESP header (for example, refer to FIG. 4).

The data reception apparatus 200 processes the headers, beginning with the header in the front of the packet in encrypting the data portion. Therefore, the data reception apparatus 200 processes the UDP header, the RTP header, and the ESP header in this sequence and decrypts the data.

According to the present invention, SA (IPsec SA) for the packet encryption and SA for the data portion encryption may be identical. Specifically, the data reception apparatus 200 uniquely specifies SA using a security parameter index (SPI) included within the ESP header and a "Destination Address" included in the IP header. For example, a value of the SPI is the same as in encrypting the packet and in encrypting the data portion.

Figure 2:
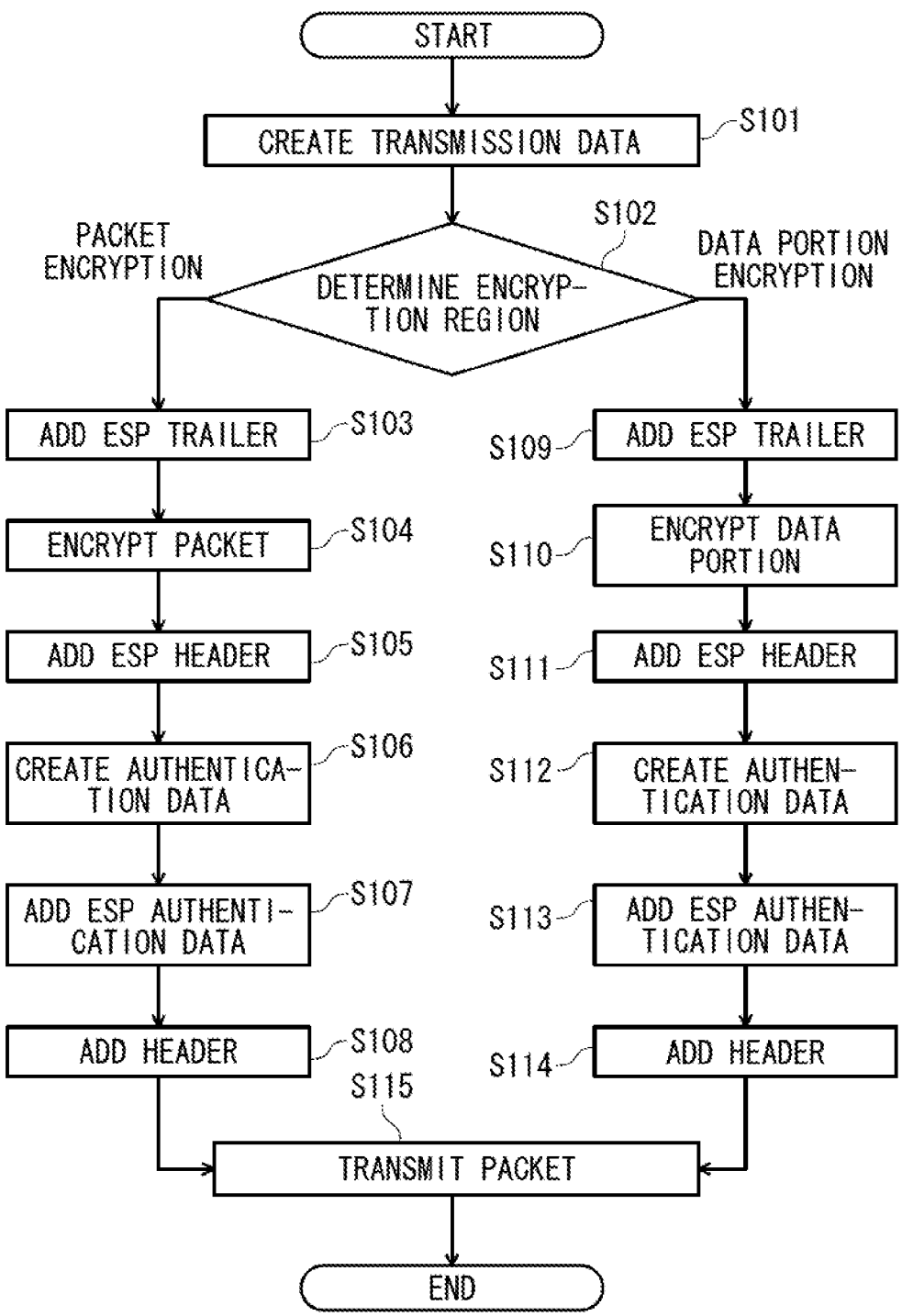
FIG. 2 is a flow chart of an operational example of the data transmission apparatus according to the first embodiment.

Next, an operational example of the data transmission apparatus 100 is described referring to FIG. 2.

First, in the data transmission apparatus 100, the transmission data creation section 130 creates transmission data (IP packet) (Step S101).

Subsequently, the encryption region determination section 160 determines which encryption (the packet encryption or the data portion encryption) to perform (Step S102).

In the case of performing the packet encryption, the packet encryption section 172 sets padding data into the transmission data so that the size of the transmission data becomes a multiple of a block size. The packet encryption section 172 sets padding length information related to the padding and protocol information following the ESP header in an ESP trailer and adds the ESP trailer to the packet (Step S103).

Subsequently, the packet encryption section 172 encrypts (performs the packet encryption on) the packet to which the ESP trailer is added (Step S104).

Subsequently, the packet encryption section 172 adds the ESP header to the encrypted packet (Step S105).

Subsequently, the packet encryption section 172 creates the authentication data in a region (an authentication region) that includes the ESP header (Step S106).

Subsequently, the packet encryption section 172 adds the authentication data (ESP authentication data) to the packet that is created in Step S105 (Step S107).

Subsequently, the packet encryption section 172 adds the IP header to the header that is created in Step S107 (Step S108). Accordingly, the packet that is transmitted is completed.

On the other hand, it is determined in Step S102 that the data portion encryption has to be performed, the data portion encryption section 171 sets padding data into the transmission data so that the size of the transmission data becomes a multiple of the block size. The data portion encryption section 171 sets the padding length information related to the padding and the protocol information following the ESP header in the ESP trailer and adds the ESP trailer to the packet (Step S109).

Subsequently, the data portion encryption section 171 encrypts (performs the data portion encryption on) the packet to which the ESP trailer is added (Step S110).

Subsequently, the data portion encryption section 171 adds the ESP header to the encrypted packet (Step S111).

Subsequently, the data portion encryption section 171 creates the authentication data in the region (the authentication region) that includes the ESP header (Step S112).

Subsequently, the data portion encryption section 171 adds the authentication data (the ESP authentication data) to the packet that is created in Step S111 (Step S113).

Subsequently, the data portion encryption section 171 adds the RTP header, the UDP header, and the IP header that are created in Step S113 (Step S114). Accordingly, the packet that is transmitted is completed.

The packet transmission section 180 transmits the completed packet (Step S115).

Figure 3:
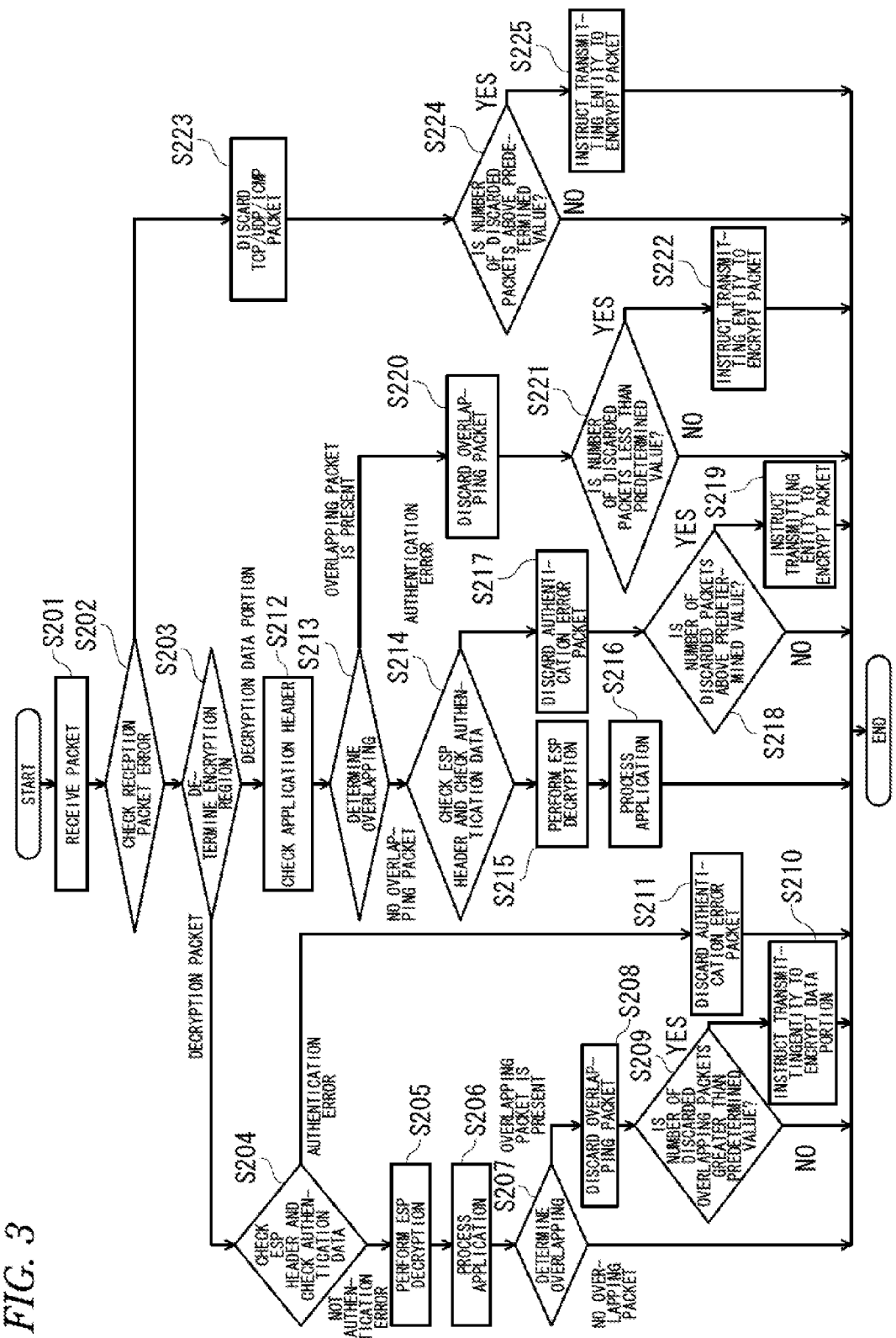
FIG. 3 is a flow chart illustrating an operational example of the data reception apparatus according to each embodiment.

Next, an operational example of the data reception apparatus 200 is described referring to FIG. 3.

In the data reception apparatus 200, the packet reception section 210 receives the packet (Step S201).

Subsequently, the packet reception section 210 checks for an error (reception error) situation of the reception packet (Step S202). For example, the packet reception section checks whether the DoS attack such as the "TCP SYN Flooding," the "UDP Flooding," the "ICMP Flooding," or the "TCP Connection Flooding" is present. If the "Sequence Number" that is included in the IP header of the reception packet is irrelevant, it is determined that the reception error is present.

If the reception error is present in the reception packet, the packet reception section 210 discards the packet (for example, the TCP packet, the UDP packet, or the ICMP packet) (Step S223). Furthermore, the number-of-reception-error-packets count section 241 counts the number of the discarded packets.

Subsequently, the encryption region switching determination section 250 determines whether or not the number of the discarded packets that is counted by the number-of-reception-error-packets count section 241 is a predetermined value or above (Step S224).

If the number of the discarded packets is a predetermined number or greater, the encryption region switching determination section 250 determines that the data transmission apparatus 100 has to be notified of the instruction for switching of the encryption region and notifies the switching instruction transmission section 260 that the data transmission apparatus 100 has to be notified of the instruction for switching of the encryption region. The switching instruction transmission section 260 notifies the data transmission apparatus 100 of the instruction for switching of the encryption region (the instruction for switching to the packet encryption).

If the reception error does not occur in Step S202, the encryption region switching determination section 250 determines the encryption region of the encrypted packet (Step S203). In determining the encryption region, the encryption region switching determination section 250 sequentially processes the headers, beginning with the header (the IP header) in the front of the packet and makes a distinction between the packet encryption being performed and the data portion encryption being performed. The encryption region switching determination section 250 makes this distinction, for example, according to the protocol information that follows the IP header.

If the packet on which the packet encryption is performed is present, the data reception apparatus 200 performs the packet decryption in Steps S204 to S211. If the data-portion-encrypted packet is present, the data reception apparatus 200 performs the data portion decryption in Steps S212 to S222.

In decrypting the packet, information indicating ESP is included in the protocol information that is included in the IP header. First, the authentication data check section 223 checks the ESP header and checks whether or not the authentication error is present (Step S204).

In checking the ESP header, the packet decryption section 222 checks the value of SPI and searches for SAD 174. If SA is not present, the packet decryption section 222 discards the reception packet.

Furthermore, the ESP header includes the "Sequence Number" indicating the order of the packets. If the "Sequence Number" is irrelevant, the packet decryption section 222 discards the reception packet. A case of irrelevance, for example, includes a case where a certain window size is determined and entry does not occur within that window size.

Furthermore, the authentication data check section 223 checks the authentication data and checks whether or not the authentication error is present (Step S204). In checking the authentication data, the authentication data check section 223 creates the authentication data from the data in an integrity coverage (for example, refer to FIG. 4) and compares the created authentication data and the authentication data added to the packet. If the result of comparison is that the created authentication data and the packet-added authentication data are different from each other, the authentication data check section 223 discards the packet.

Subsequently, the packet decryption section 222 decrypts the encrypted packet in the encryption coverage (for example, refer to FIG. 4) (Step S205). The encryption coverage includes the UDP header, the RTP header, the RTP data (Encrypted Data, for example, the image or the voice data), and the ESP trailer.

Subsequently, the receiving-side application management section 270 processes an application using the post-decryption data (Step S206).

Subsequently, the UDP/TCP header processing section 231 or the application header processing section 232 checks whether or not the reception packet is the overlapping packet (Step S207). For example, if the packet including the same header as the decrypted UDP header or RTP header is previously received, the UDP/TCP header processing section 231 or the application header processing section 232 determines that the reception packet is the overlapping packet.

If the reception packet is the overlapping packet, the UDP/TCP header processing section 231 or the application header processing section 232 discards the overlapping packet (Step S208). Furthermore, the number-of-overlapping-packets count section 243 counts the number of the discarded packets. The number of the discarded packets is the same as the number of the discarded overlapping packets.

Subsequently, the encryption region switching determination section 250 determines whether or not the number of the discarded packets that is counted by the number-of-overlapping-packets count section 243 is the predetermined value or greater (Step S209).

If the number of the discarded packets is the predetermined number or greater, the encryption region switching determination section 250 determines that the data transmission apparatus 100 has to be notified of the instruction for switching of the encryption region and notifies the switching instruction transmission section 260 that the data transmission apparatus 100 has to be notified of the instruction for switching of the encryption region. The switching instruction transmission section 260 notifies the data transmission apparatus 100 of the instruction for switching of the encryption region (the instruction for switching to the data portion encryption) (Step S210).

If the authentication error occurs in Step S204, the authentication data check section 223 discards the packet that includes the authentication error (Step S211).

If the data portion encryption is performed in Step S203, when the headers are sequentially processed, beginning with the header in the front of the packet, the UDP header appears and the RTP header following the UDP header appears.

First, the data portion decryption section 221 checks the RTP header (Step S212), and the RTP header includes information (for example, a program number: 50 in FIG. 10) indicating that the ESP header follows an RP header.

Subsequently in processing the UDP header or the RTP header, the UDP/TCP header processing section 231 or the application header processing section 232 checks for the overlapping packet (Step S213).

If the overlapping packet is present, the UDP/TCP header processing section 231 or the application header processing section 232 discards the overlapping packet (Step S220). Furthermore, the number-of-overlapping-packets count section 243 counts the number of the discarded packets. The number of the discarded packets is the same as the number of the discarded overlapping packets.

Subsequently, the encryption region switching determination section 250 determines whether or not the number of the discarded packets that is counted by the number-of-overlapping-packets count section 243 is the predetermined value or greater (Step S221).

If the number of the discarded packets is a predetermined number or greater, the encryption region switching determination section 250 determines that the data transmission apparatus 100 has to be notified of the instruction for switching of the encryption region and notifies the switching instruction transmission section 260 that the data transmission apparatus 100 has to be notified of the instruction for switching of the encryption region. The switching instruction transmission section 260 notifies the data transmission apparatus 100 of the instruction for switching of the encryption region (the instruction for switching to the packet encryption) (Step S222).

If the reception packet is not the overlapping packet in Step S213, the authentication data check section 223 checks the ESP header and checks the authentication data in the same manner as in Step S204 (Step S214).

If the authentication error occurs in Step S214, the authentication data check section 223 discards the packet including the authentication error (Step S217). Furthermore, the number-of-authentication-error-packets count section 242 counts the number of the discarded packets. The number of the discarded packets is the same as the number of the authentication error packets.

Subsequently, the encryption region switching determination section 250 determines whether or not the number of the discarded packets that is counted by the number-of-authentication-packets count section 242 is the predetermined value or greater (Step S218).

If the number of the discarded packets is a predetermined number or greater, the encryption region switching determination section 250 determines that the data transmission apparatus 100 has to be notified of the instruction for switching of the encryption region and notifies the switching instruction transmission section 260 that the data transmission apparatus 100 has to be notified of the instruction for switching of the encryption region. The switching instruction transmission section 260 notifies the data transmission apparatus 100 of the instruction for switching of the encryption region (the instruction for switching to the packet encryption) (Step S219).

If the authentication error is not present in Step S214, the data portion decryption section 221 decrypts the encrypted packet in the encryption coverage (for example, refer to FIG. 4) (Step S215). The encryption coverage includes the RTP data (Encrypted Data, for example, the image or the voice data), and the ESP trailer.

Subsequently, the receiving-side application management section 270 processes the application using the decrypted data (Step S216).

Next, an operational mode in the data communication system 1000 is described. In the data communication system 1000, the communication takes place using IPsec. There are two kinds of IPsec operation modes, a tunnel mode in which the entire packet is encrypted and a transport mode in which what follows the IP header is encrypted.

[Transport Mode]

Next, the transport mode is described.

Figure 4:
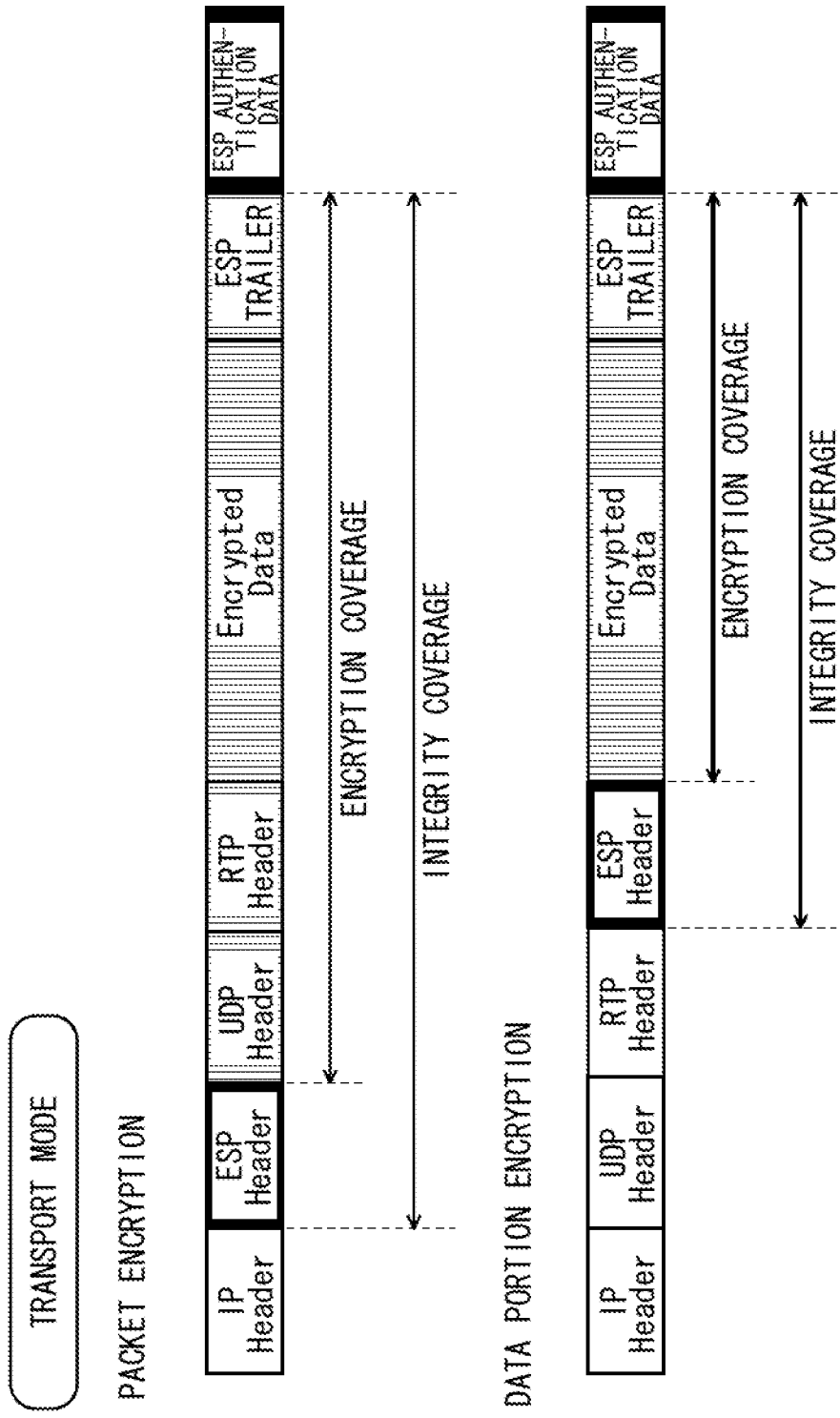
FIG. 4 is a diagram of one example of a packet format of a transport mode according to the first embodiment.

FIG. 4 is a diagram illustrating one example of a packet format that is used in encrypting the packet in the transport mode and one example of the packet format that is used in encrypting the data portion in the transport mode.

Figure 5:
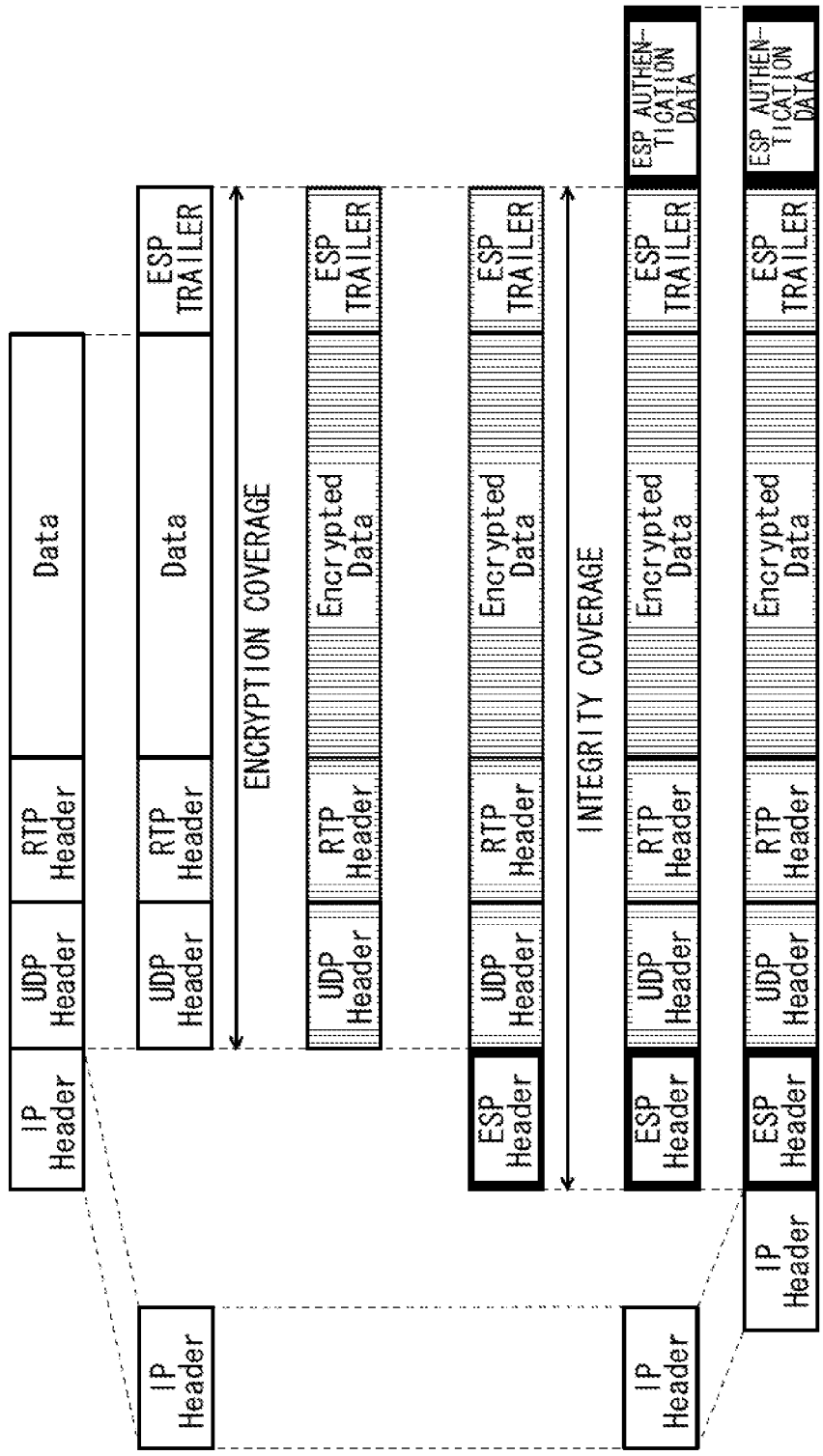
FIG. 5 is a diagram of one example of packet encryption in the transport mode according to the first embodiment.

The packet encryption in the transport mode by the data transmission apparatus 100 is described referring to FIG. 5. The processing proceeds from top to bottom in FIG. 5.

In the data transmission apparatus 100, the transmission data creation section 130 creates the transmission data (the IP packet). The IPsec encryption section 170 inserts the ESP header between the IP header and the UDP header.

First, the IPsec encryption section 170 adds the ESP trailer. The ESP trailer is additional data for performing block encryption and makes the size of packet data a multiple of a block length. Padding length information and the protocol information are added to the ESP trailer.

Figure 6:
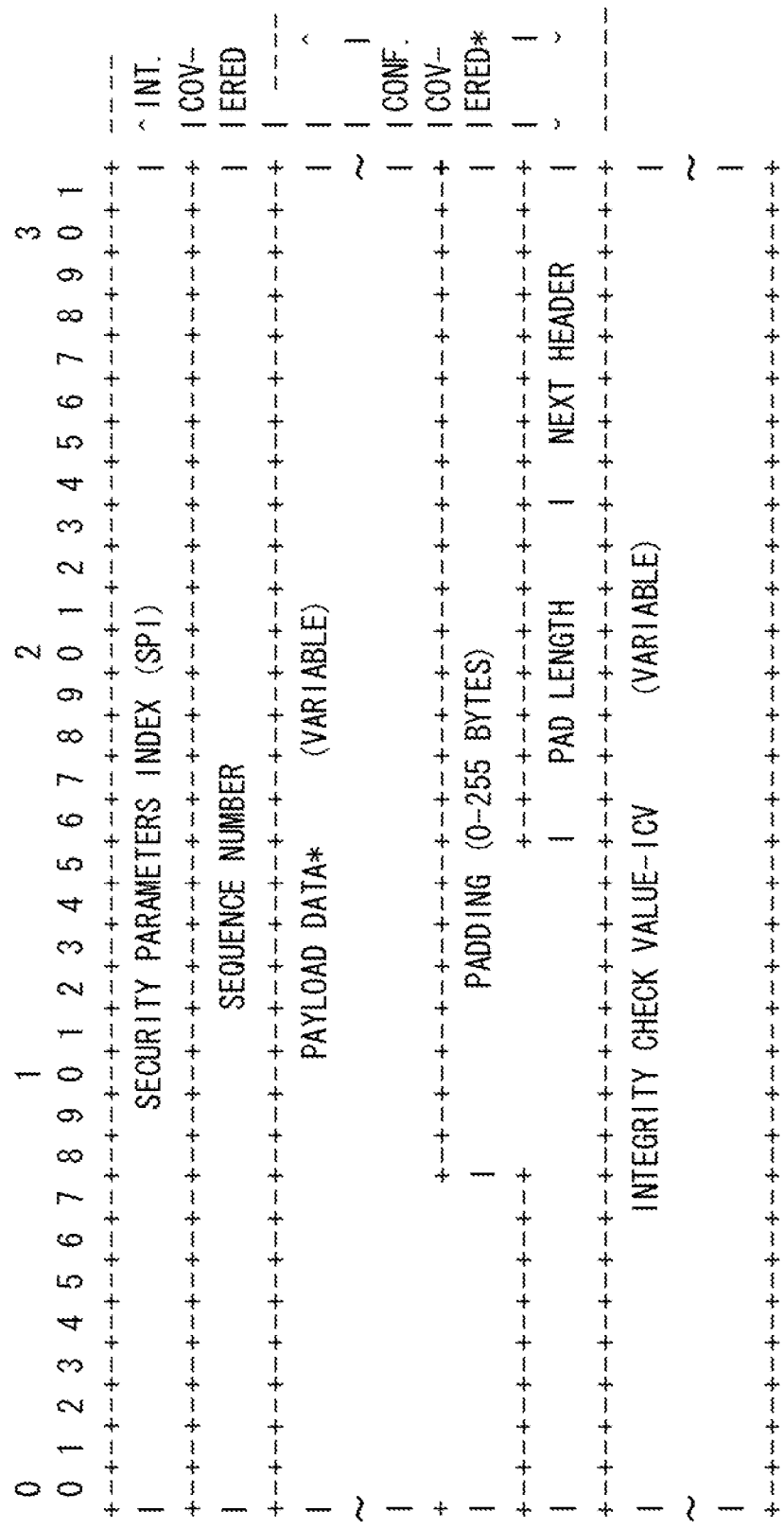
FIG. 6 is a diagram illustrating an ESP packet format.

FIG. 6 is a diagram illustrating an ESP packet format. An ESP packet includes the ESP header, the ESP data, and the ESP trailer. The ESP header includes information, such as "SPI," and "Sequence Number." The ESP data includes "Payload Data." The ESP trailer includes "Padding," "pad length (Padding Length)." and a "Next, Header." The padding length information is stored in the "Pad Length." and the protocol information following ESP is stored in the "Next Header."

Subsequently, the IPsec encryption section 170 encrypts the data in the encryption coverage from the UDP header to the ESP trailer.

Subsequently, the IPsec encryption section 170 adds the ESP header to the beginning of the encrypted data.

The IPsec encryption section 170 creates the authentication data, based on the data in the integrity coverage from the ESP header to the ESP trailer. Furthermore, the IPsec encryption section 170 adds the authentication data in the end of the encrypted data, that is, after the ESP trailer.

Subsequently, the IPsec encryption section 170 adds the IP header to the beginning of the encrypted data, that is, before the UDP header. The protocol information following the IP header is included in the IP header.

Moreover, the protocol information that is initially set in the transmission data (the IP packet) created by the transmission data creation section 130 is, for example. UDP, but the IPsec encryption section 170 stores the UDP information in the ESP trailer. Further, the IPsec encryption section 170 sets an ESP protocol number (50) for IP header protocol information. Accordingly, the packet-encrypted IP packet is completed.

Figure 7:
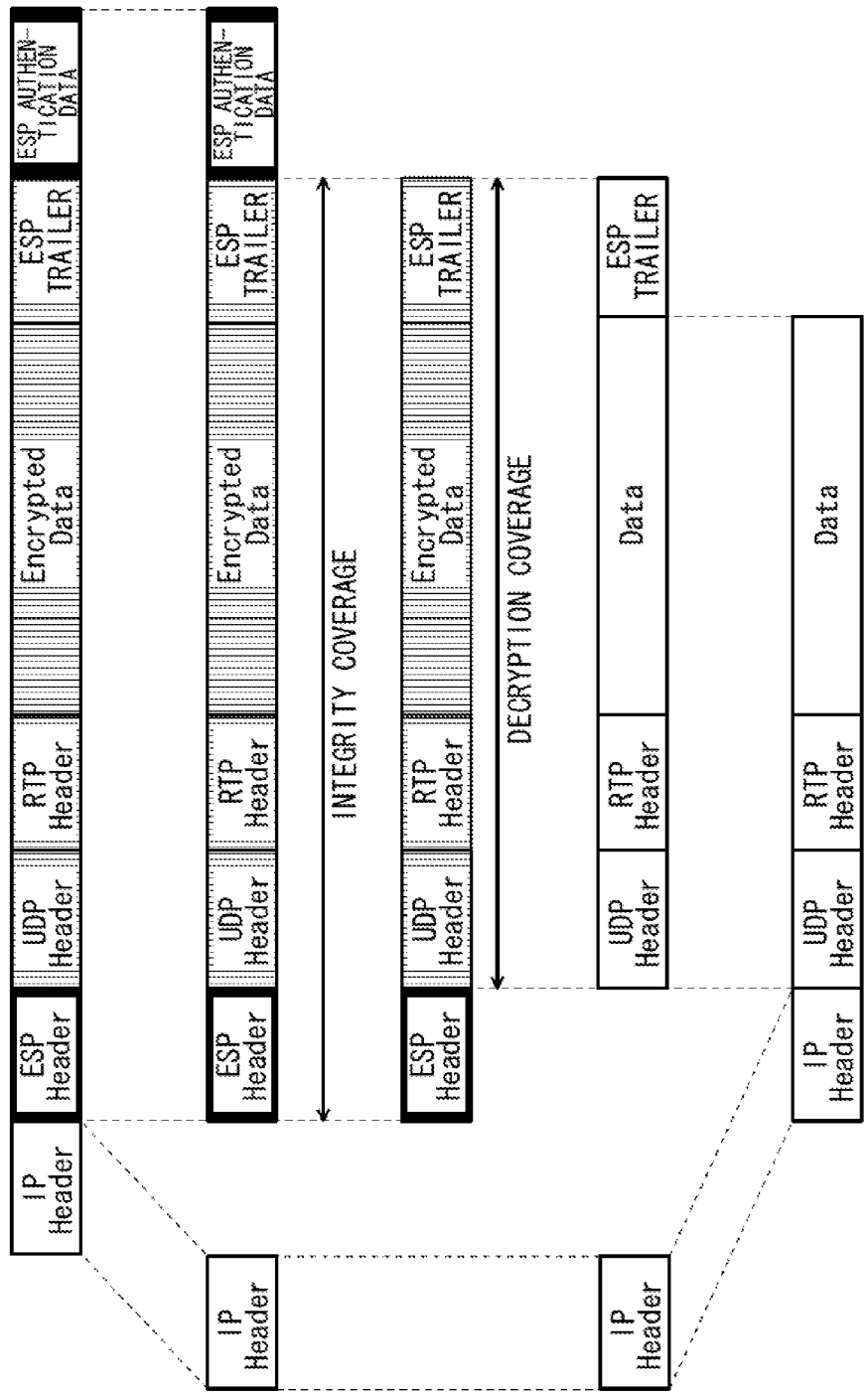
FIG. 7 is a diagram illustrating one example of packet decryption in the transport mode according to the first embodiment.

Next, the packet decryption in the transport mode by the data reception apparatus 200 is described referring to FIG. 7. The processing proceeds from top to bottom in FIG. 7.

In the data reception apparatus 200, the IPsec decryption section 220 generates the decrypted IP packet from the encrypted IP packet.

The IPsec decryption section 220 can recognize that the ESP encryption is performed because the ESP protocol number (50) is set in the protocol information that is entered in the IP header. The IPsec decryption section 220 extracts ESP authentication data that is added to the end of the data. The integrity coverage is from the front of the ESP header to the end of the ESP trailer.

The IPsec decryption section 220 creates the authentication data using the data in the integrity coverage. The IPsec decryption section 220 compares the created authentication data and the authentication data added to the reception packet. If the created authentication data and the added authentication data are different from each other, the IPsec decryption section 220 discards the packet.

If the created authentication data and the added authentication data are consistent with each other, the IPsec decryption section 220 separates the ESP header and decrypts the data in a decryption coverage from the encrypted UDP header to the ESP trailer. The padding length information is included in the decrypted ESP trailer. The IPsec decryption section 220 refers to the padding length information and deletes the padding added to the rear portion of the decrypted data.

Furthermore, the IPsec decryption section 220 returns (sets) the protocol information included in the ESP header to (in) the IP header and adds the IP header to the front, that is, to the beginning of the UDP header. Accordingly, the packet-decrypted IP packet is completed.

Figure 8:
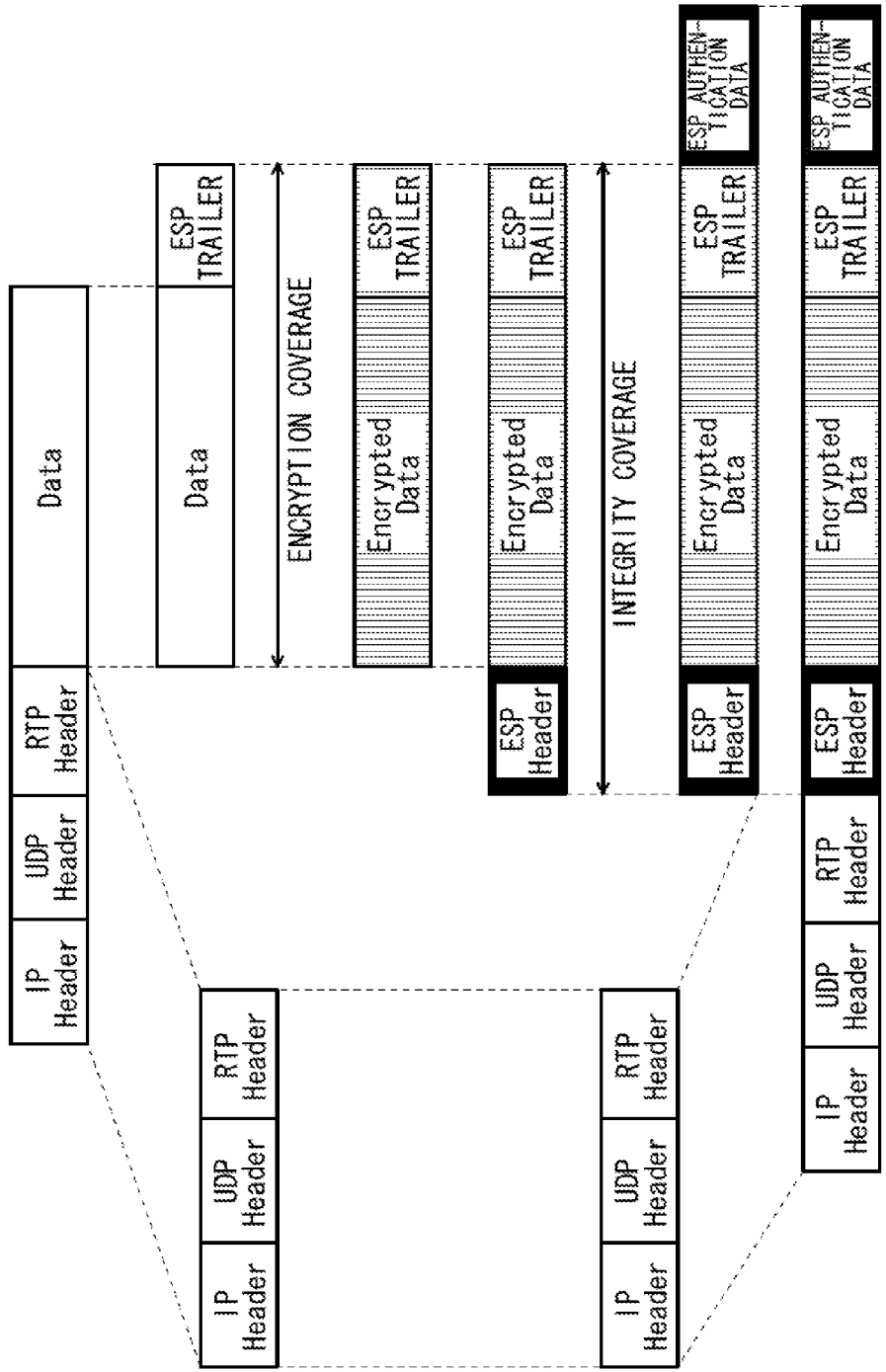
FIG. 8 is a diagram illustrating one example of data portion encryption in the transport mode according to the first embodiment.

Next, the data portion encryption in the transport mode by the data transmission apparatus 100 is described referring to FIG. 8. The processing proceeds from top to bottom in FIG. 8.

In the data transmission apparatus 100, the transmission data creation section 130 creates the transmission data (the IP packet). The IPsec encryption section 170 inserts the ESP header between the RTP header and the RTP data (Encrypted Data).

First, the IPsec encryption section 170 separates the IP header, the UDP header, and the RTP header from the IP packet created by the transmission data creation section 130, and adds the ESP trailer to the RTP data (Data). The IPsec encryption section 170 sets payload type (PT) information, included in the RTP header, in ESP trailer protocol information.

Figure 9:
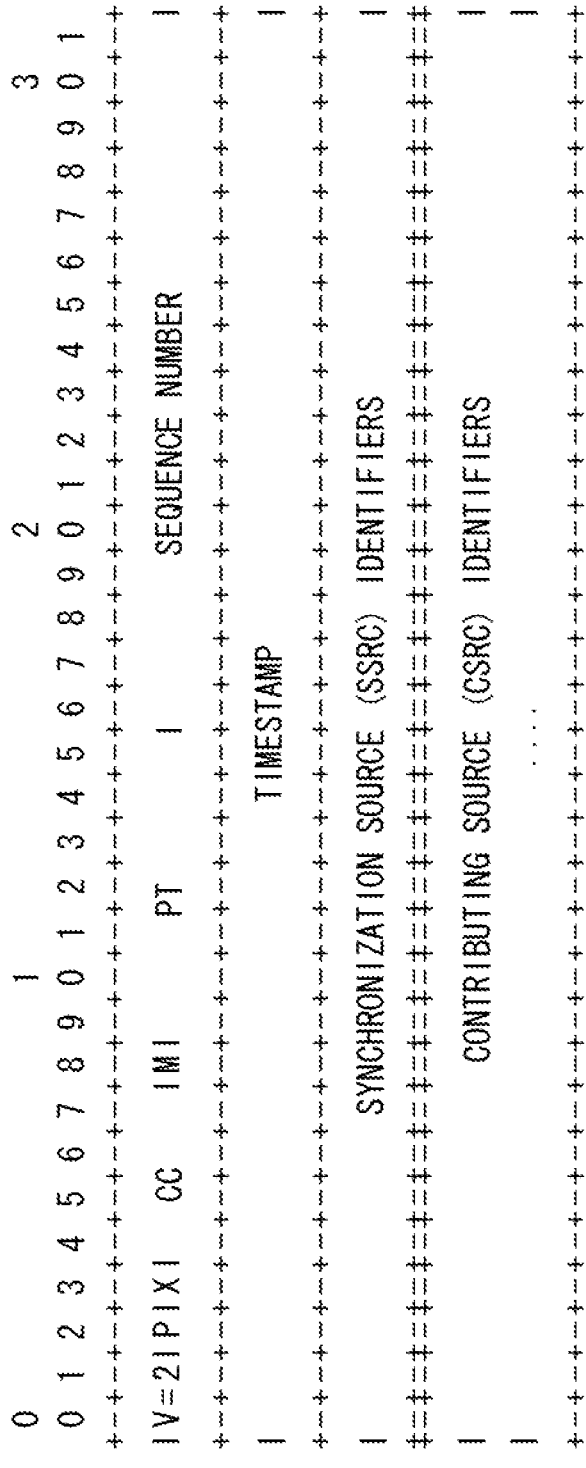
FIG. 9 is a diagram illustrating an RTP header format.

An example of the RTP header format is illustrated in FIG. 9.

Subsequently, the IPsec encryption section 170 encrypts the data in the encryption coverage from the RTP data (Data) to the ESP trailer. Furthermore, the IPsec encryption section 170 adds the ESP header to the beginning of the encrypted data.

Subsequently, the IPsec encryption section 170 creates the authentication data, based on the data in the integrity coverage from the ESP header to the ESP trailer. The IPsec encryption section 170 adds authentication data to the end of the encrypted data.

Subsequently, the IPsec encryption section 170 adds the IP header, the UDP header, and the RTP header to the beginning of the ESP header. Payload type information (PT in FIG. 9) is included in the RTP header. The IPsec encryption section 170 sets the ESP protocol number (50) in PT. Thus, the data-portion-encrypted IP packet is completed.

FIG. 10 is a diagram illustrating one part of a relation between a protocol number and a protocol name. In FIG. 10, information in the left-side column indicates the protocol number, information in the middle column indicates the protocol name (or abbreviation), and information in the right-side column indicates supplementary information on the protocol name.

Figure 11:
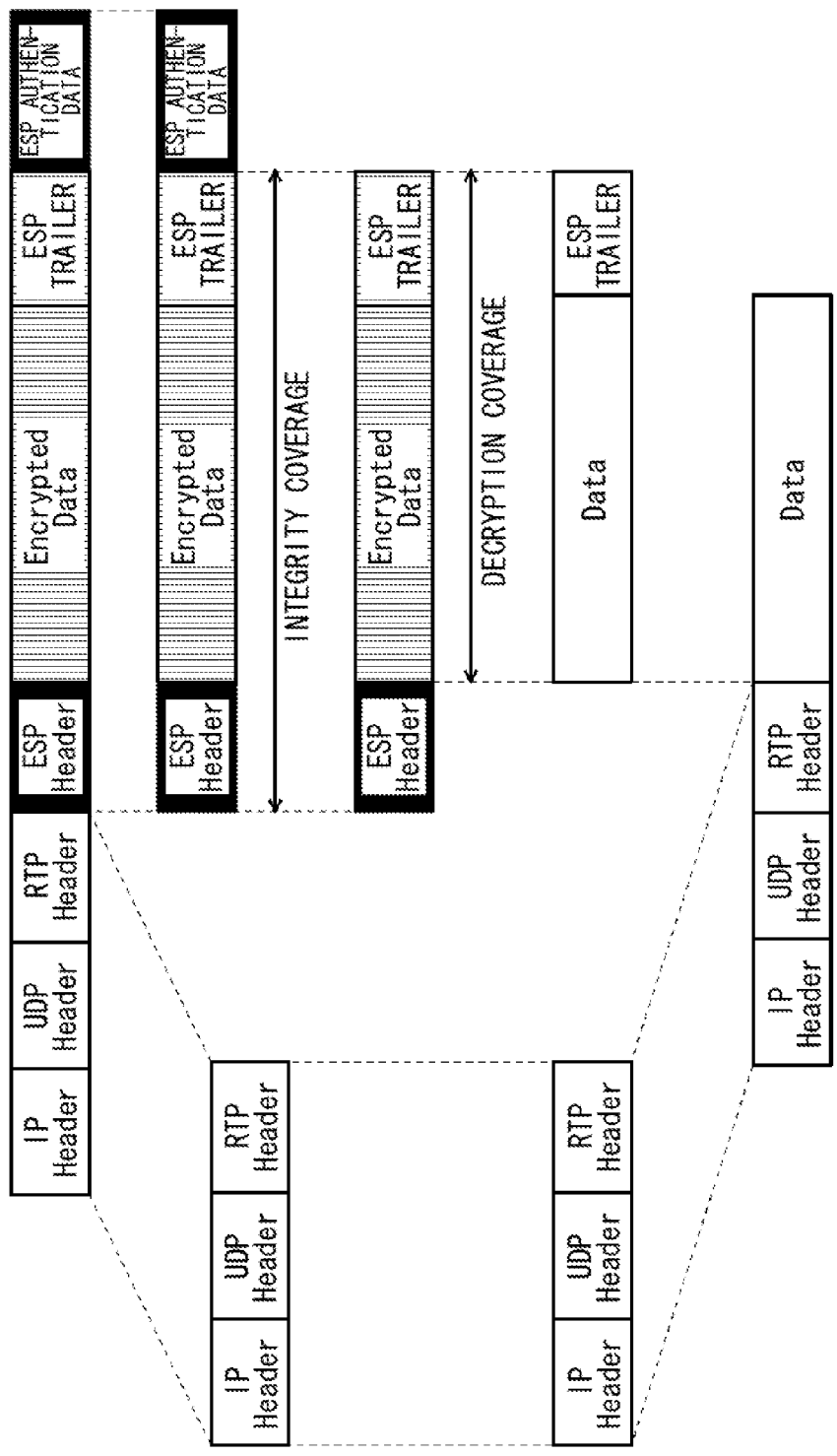
FIG. 11 is a diagram illustrating one example of data portion decryption in the transport mode according to the first embodiment.

Next, the data portion decryption in the transport mode by the data reception apparatus 200 is described referring to FIG. 11. The processing proceeds from top to bottom in FIG. 11.

In the data reception apparatus 200, the IPsec decryption section 220 generates the decrypted IP packet from the encrypted IP packet.

A UDP protocol number (17) is set in the protocol information that is entered in the IP header. Port number information is included in the UDP header and the application received from the port number is specified.

The IPsec decryption section 220 is aware that the RTP header is added to the reception packet by referring to the port number. Accordingly, the application header processing section 232 can process the RTP header. In processing the RTP header, the application header processing section 232 checks for the overlapping packet and if the overlapping packet is present, discards the overlapping packet.

Subsequently, the IPsec decryption section 220 performs ESP decryption because the ESP protocol number (50) is set in payload type (PT) information on the RTP header.

First, the IPsec decryption section 220 cuts out the ESP authentication data that is added to the end of the reception packet. The integrity coverage is from the front of the ESP header to the end of the ESP trailer.

The IPsec decryption section 220 creates the authentication data, based on the data included in the integrity coverage. The IPsec decryption section 220 compares the created authentication data and the authentication data added to the reception packet. If the created authentication data and the added authentication data are different from each other, the IPsec decryption section 220 discards the reception packet.

If the created authentication data and the added authentication data are consistent with each other, the IPsec decryption section 220 separates the ESP header and decrypts the data in a decryption coverage from the encrypted RTP data ("Encrypted Data") to the ESP trailer.

The IPsec decryption section 220 refers to the padding length information included in the decrypted ESP trailer and deletes the padding that is added to the rear portion of the decrypted data.

The IPsec decryption section 220 re-sets the protocol information, included in the ESP header, in the payload type (PT) of the RTP header. Furthermore, the IPsec decryption section 220 adds the IP header, the UDP header, and the RTP header to the beginning of the decrypted data (Data). Accordingly, the data-portion-decrypted IP packet is completed.

[Tunnel Mode]

Next, the tunnel mode is described.

Figure 12:
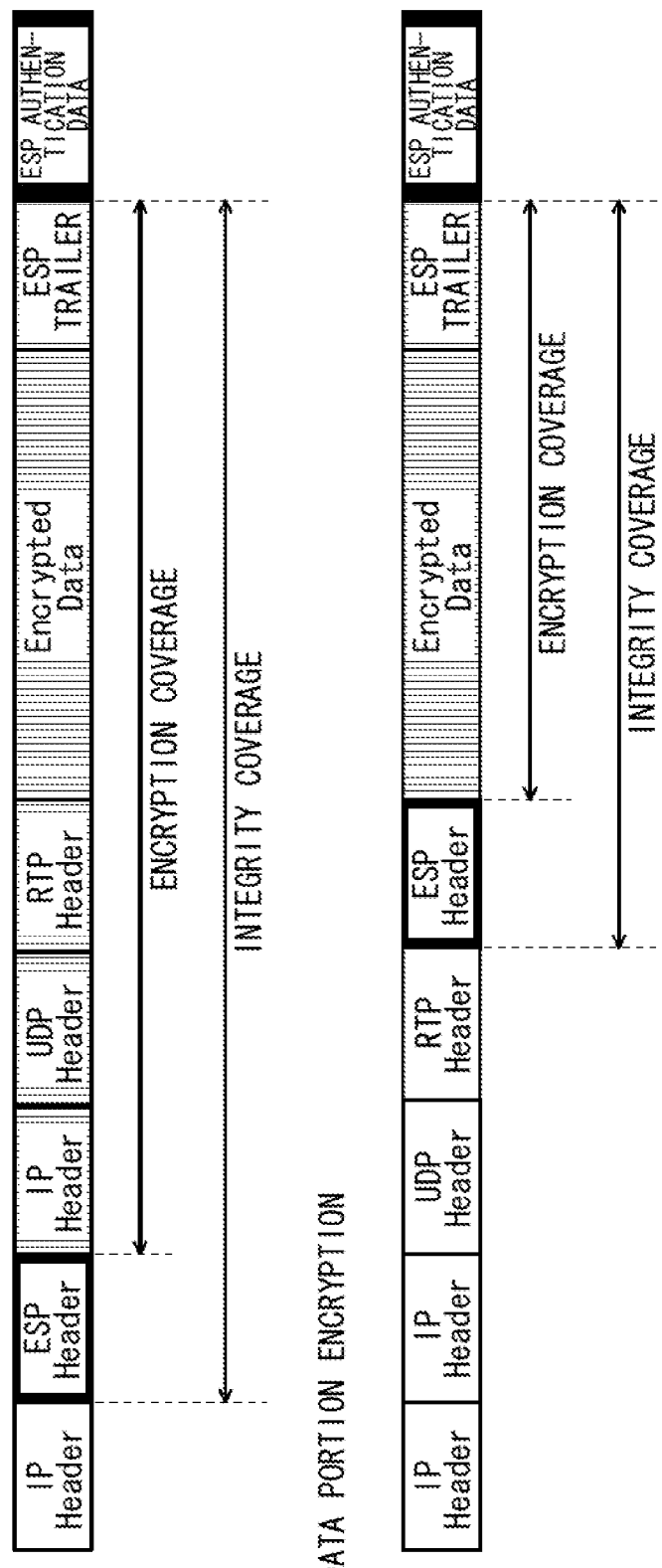
FIG. 12 is a diagram illustrating one example of a packet format of a tunnel mode according to the first embodiment.

FIG. 12 is a diagram illustrating one example of a packet format that is used in encrypting the packet in the tunnel mode and one example of the packet format that is used in encrypting the data portion in the tunnel mode.

Figure 13:
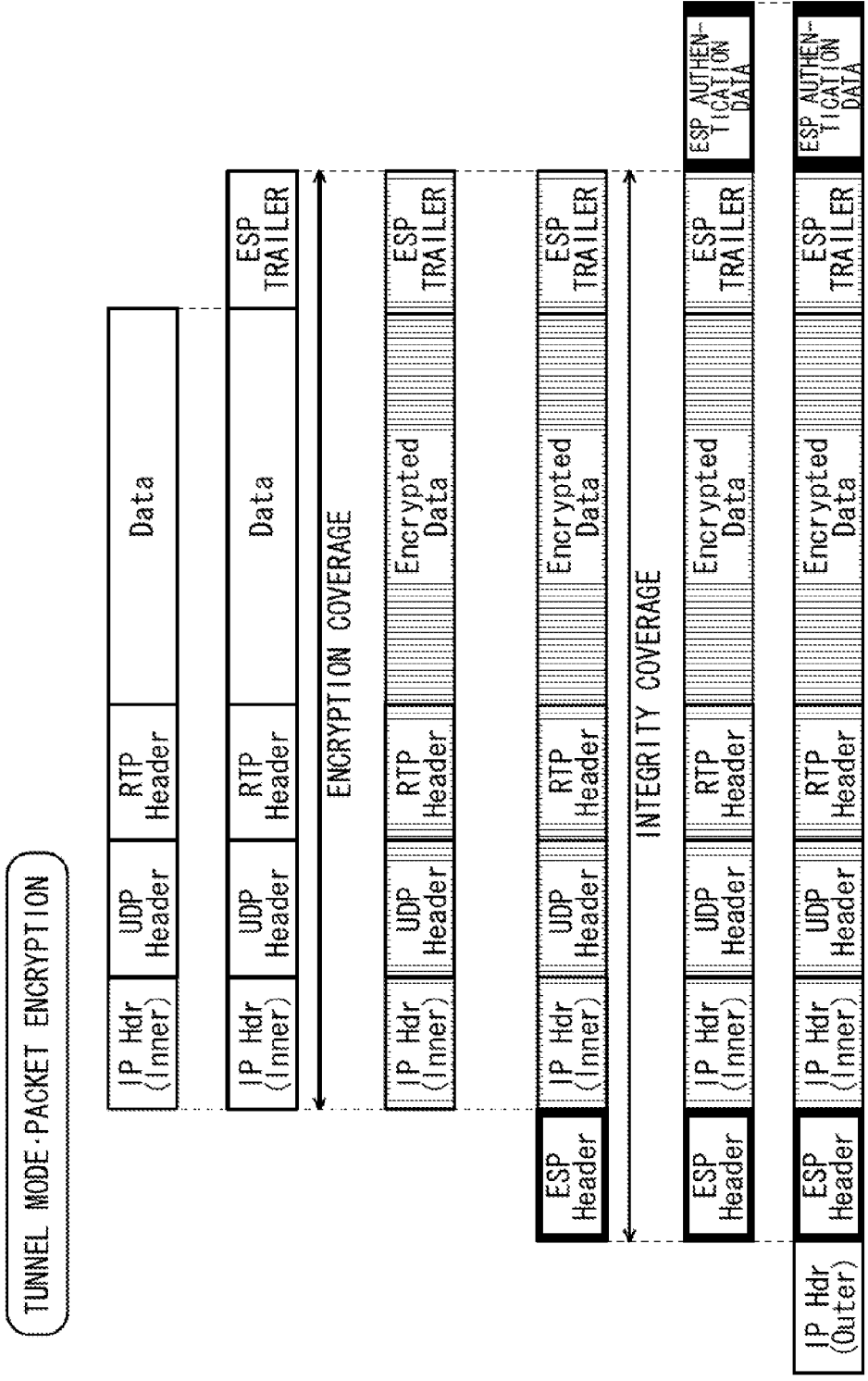
FIG. 13 is a diagram illustrating packet encryption in the tunnel mode according to the first embodiment.

The packet encryption in the tunnel mode by the data transmission apparatus 100 is described referring to FIG. 13. The processing proceeds from top to bottom in FIG. 13.

In the data transmission apparatus 100, the transmission data creation section 130 creates the transmission data (the IP packet). Furthermore, the IPsec encryption section 170 performs IP encapsulation by adding the ESP header to the IP packet.

First, the IPsec encryption section 170 adds the ESP trailer to the IP packet created by the transmission data creation section 130. A number (4) indicating the IP header is set in the ESP trailer protocol information.

Subsequently, the IPsec encryption section 170 encrypts the data in the encryption coverage from the IP header (Inner) to the ESP trailer. Furthermore, the IPsec encryption section 170 adds the ESP header to the beginning of the encrypted data. Moreover, the encryption coverage includes the IP header (Inner), the UDP header, the RTP header, the RTP data (Data), and the ESP trailer.

Subsequently, the IPsec encryption section 170 creates the authentication data, based on the data in the integrity coverage from the ESP header to the ESP trailer. The IPsec encryption section 170 adds authentication data to the end of the encrypted data. Moreover, the integrity coverage includes the ESP header, the IP header (Inner), the UDP header, the RTP header, the RTP data (Data), and the ESP trailer.

Subsequently, the IPsec encryption section 170 adds the IP header (Outer) to the beginning of the ESP header. The IP header (Outer) is a header of the IP-encapsulated data. Furthermore, the IPsec encryption section 170 sets the ESP protocol number (50) in IP header (Outer) protocol information. Accordingly, the packet-encrypted IP packet is completed.

Figure 14:
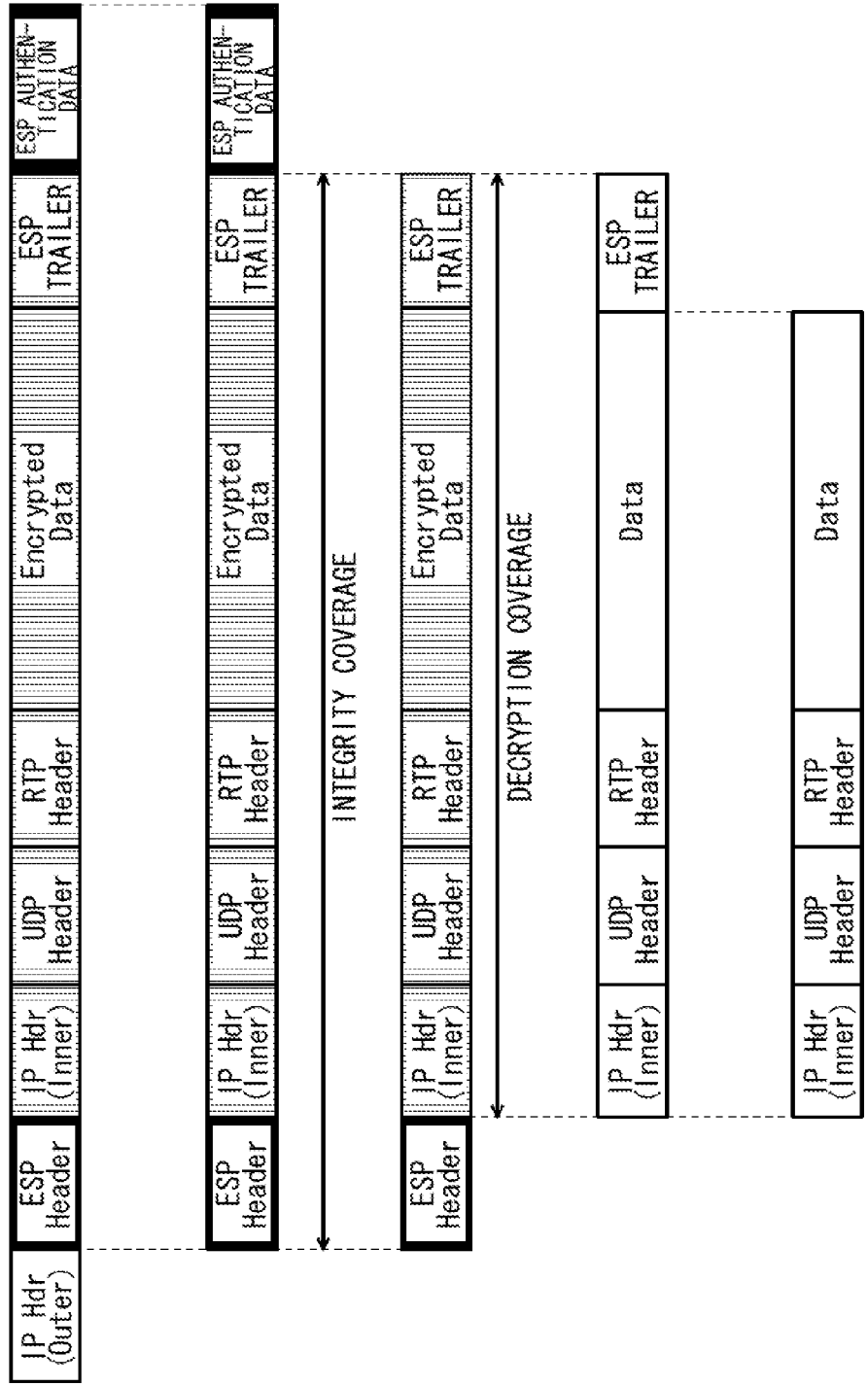
FIG. 14 is a diagram illustrating one example of packet decryption in the tunnel mode according to the first embodiment.

Next, the packet decryption in the tunnel mode by the data reception apparatus 200 is described referring to FIG. 14. The processing proceeds from top to bottom in FIG. 14.

In the data reception apparatus 200, the IPsec decryption section 220 generates the decrypted IP packet from the encrypted IP packet.

The ESP protocol number (50) is set in the protocol information that is entered in the IP header (Outer). Accordingly, the IPsec decryption section 220 can recognize that the ESP encryption is performed and extracts the ESP authentication data that is added to the end of the reception packet.

The IPsec decryption section 220 creates the authentication data, based on the data in the integrity coverage from the front of the ESP header to the end of the ESP trailer. The IPsec decryption section 220 compares the created authentication data and the authentication data added to the reception packet. If the created authentication data and the added authentication data are different from each other, the IPsec decryption section 220 discards the reception packet.

If the created authentication data and the added authentication data are consistent with each other, the IPsec decryption section 220 extracts the ESP header and decrypts the data in the decryption coverage from the encrypted IP header (Inner) to the ESP trailer. The padding length information is included in the decrypted ESP trailer. The IPsec decryption section 220 refers to the padding length information and deletes the padding added to the rear portion of the decrypted RTP data (Data).

Furthermore, the IPsec decryption section 220 can recognize that the decrypted data is the IP packet by referring to the protocol information that is included in the ESP header. Furthermore, because with the result of searching SAD 224, the IPsec decryption section 220 can recognize that the tunnel mode is in use, the IPsec decryption section 220 can recognize that the post-decryption data is the IP packet. Accordingly, the packet-decrypted IP packet is completed.

Figure 15:
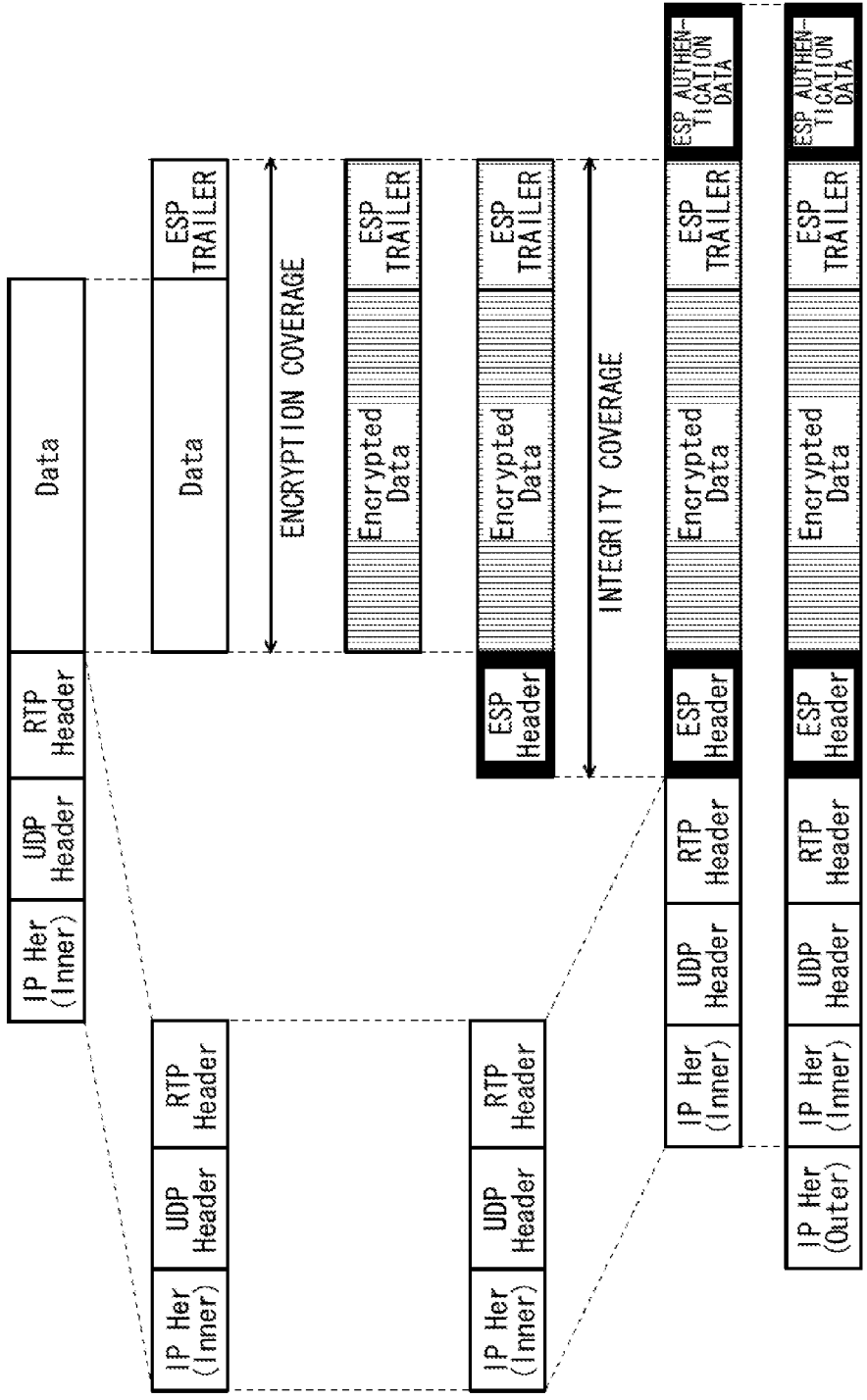
FIG. 15 is a diagram illustrating one example of data portion encryption in the tunnel mode according to the first embodiment.

Next, the data portion encryption in the tunnel mode by the data transmission apparatus 100 is described referring to FIG. 15. The processing proceeds from top to bottom in FIG. 15.

In the data transmission apparatus 100, the transmission data creation section 130 creates the transmission data (the IP packet). Furthermore, the IPsec encryption section 170 inserts the ESP header between the RTP header and the RTP data (Encrypted Data) and performs the IP encapsulation. Furthermore, the IPsec encryption section 170 adds an IP encapsulation IP header (Outer) to the front of the IP-capsulated data.

First, the IPsec encryption section 170 separates the IP header (Inner), the UDP header, and the RTP header from the IP packet created by the transmission data creation section 130, and adds the ESP trailer to the RTP data (Data). The IPsec encryption section 170 sets the payload type information (PT), included in the RTP header, in the ESP trailer protocol information.

Subsequently, the IPsec encryption section 170 encrypts the data in the encryption coverage from the RTP data to the ESP trailer. The IPsec encryption section 170 adds the ESP header to the beginning of the encrypted data.

Subsequently, the IPsec encryption section 170 creates the authentication data, based on the data in the integrity coverage from the ESP header to the ESP trailer. The IPsec encryption section 170 adds authentication data to the end of the encrypted data.

Subsequently the IPsec encryption section 170 adds the IP header (Inner), the UDP header, and the RTP header to the beginning of the ESP header. The payload type (PT) information is included in the RTP header. The IPsec encryption section 170 sets the ESP protocol number (50) in an RTP header PT.

Subsequently, the IPsec encryption section 170 adds the IP encapsulation IP header (Outer) to the beginning of the IP header (Inner) created by the transmission data creation section 130. Accordingly, the data-portion-encrypted IP packet is completed.

Figure 16:
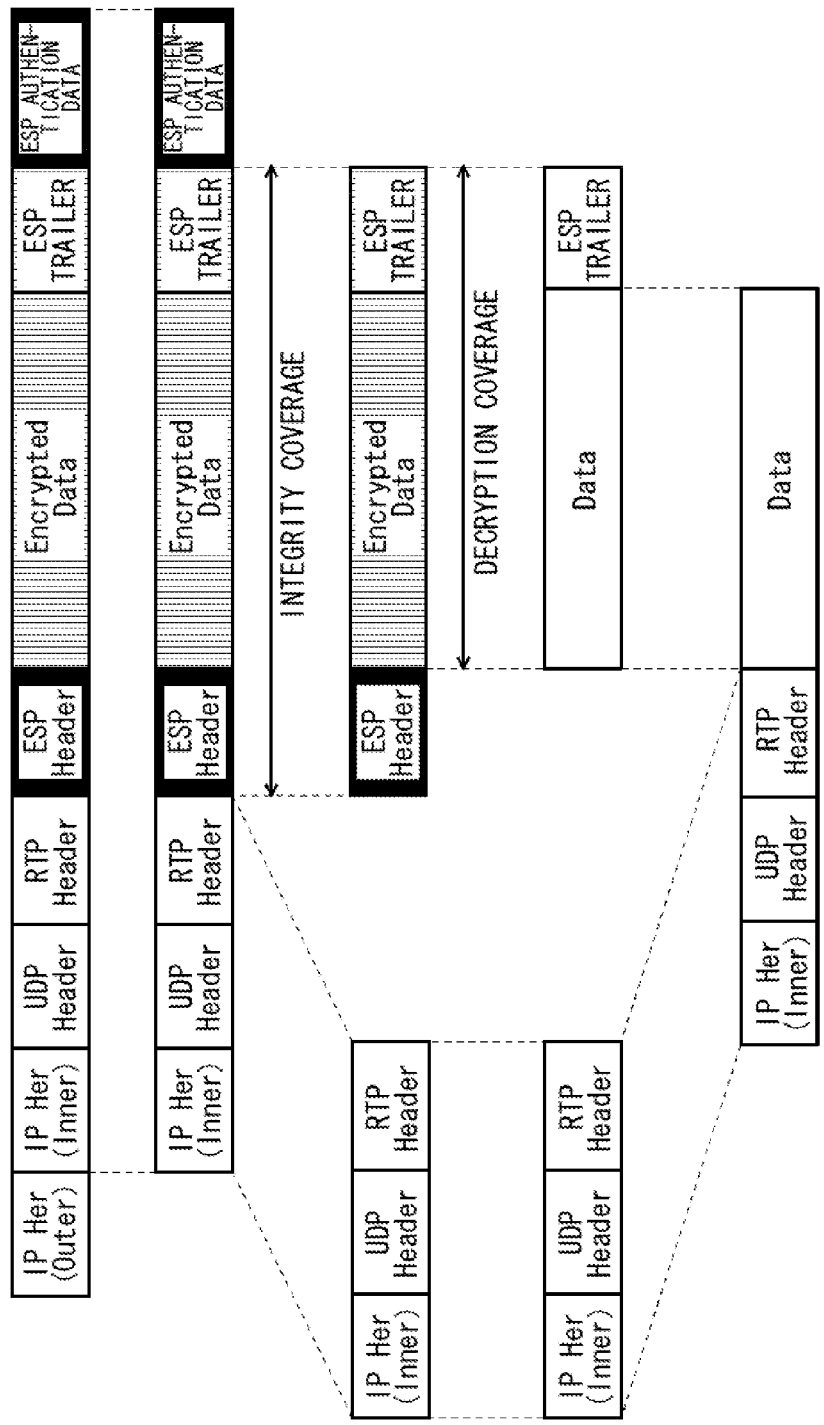
FIG. 16 is a diagram illustrating one example of data portion decryption in the tunnel mode according to the first embodiment.

Next, the data portion decryption in the tunnel mode by the data reception apparatus 200 is described referring to FIG. 16. The processing proceeds from top to bottom in FIG. 16.

In the data reception apparatus 200, the IPsec decryption section 220 generates the decrypted IP packet from the encrypted IP packet.

The IP protocol number (4) is set in the protocol information that is entered in an external IP header (Outer). Because the IP header (Outer) is the header of the IP encapsulation, the IPsec decryption section 220 deletes the IP header (Outer) and searches for an internal IP header (Inner).

A UDP protocol number (17) is set in the protocol information that is entered in the IP header (Inner). Because the port number information is included in the UDP header, the IPsec decryption section 220 specifies the application that is received from the port number.

The IPsec decryption section 220 can be aware that the RTP header is added. Accordingly, the application header processing section 232 processes the RTP header. In processing the RTP header, the IPsec decryption section 220 checks for the overlapping packet and if the overlapping packet is present, discards the overlapping packet.

Subsequently, the IPsec decryption section 220 performs the ESP decryption because the ESP protocol number (50) is set in the payload type (PT) information on the RTP header.

In decrypting ESP, first, the IPsec decryption section 220 separates the ESP authentication data that is added to the end of the data. The IPsec decryption section 220 creates the authentication data, based on the data in the integrity coverage from the front of the ESP header to the end of the ESP trailer. The IPsec decryption section 220 compares the created authentication data and the authentication data added to the packet. If the created authentication data and the added authentication data are different from each other, the IPsec decryption section 220 discards the packet.

If the created authentication data and the added authentication data are consistent with each other, the IPsec decryption section 220 separates the ESP header and decrypts the data in the decryption coverage from the encrypted RTP data (Encrypted Data) to the ESP trailer.

The padding length information is included in the decrypted ESP trailer. The IPsec decryption section 220 refers to the padding length information and deletes the padding added to the rear portion of the decrypted data.

The IPsec decryption section 220 re-sets the protocol information, included in the ESP header, in the payload type (PT) of the RTP header. Furthermore, the IPsec decryption section 220 adds the IP header, the UDP header, and the RTP header to the beginning of the RTP header. Accordingly, the post-decryption IP packet is completed.

In this manner, in the data transmission apparatus 100, the encryption section may switch between the first encryption and the second encryption. The encryption section, for example, includes the encryption region determination section 160 and the IPsec encryption section 170. Accordingly, whether to enhance further reducing of the unnecessary decryption or enhance further reducing of the denial-of-service attack can be set depending on a communication environment.

Furthermore, in the data transmission apparatus 100, the encryption section may add the header not included in the encryption coverage to the beginning of an encryption header including information on the encryption. The header not included in the encryption coverage is, for example, the UDP header or the RTP header. The encryption header is, for example, the ESP header.

Accordingly, a design of the data transmission apparatus 100 can be simplified. The program is made for general use such that the encryption header and the encryption data (for example, the ESP data or the data in the encryption coverage) are successive. This sequence of headers improves the versatility.

Furthermore, in the data reception apparatus 200, the encryption instruction section may instruct the data transmission apparatus 100 to switch between the first encryption and the second encryption. The encryption instruction section includes, for example, the encryption region switching determination section 250 and the switching instruction transmission section 260.

Accordingly, whether to enhance further reducing of the unnecessary decryption or enhance further reducing of the denial-of-service attack can be set depending on the communication environment that is detected by the data reception apparatus 200.

Furthermore, in the data reception apparatus 200, if the number of the packets that are received and are not encrypted is a predetermined number or greater, the encryption instruction section may determine that the first encryption has to be performed. The first encryption is, for example, the packet encryption. The packet that is received and is not encrypted is, for example, the packet that includes the reception error.

If the reception errors are many, there is a high likelihood that the denial-of-service attack (DoS attack) will occur. Further reducing of the denial-of-service attack can be enhanced by setting an encryption format used by the data transmission apparatus 100 to the first encryption.

Furthermore, the data reception apparatus 200 includes an authentication section that authenticates the received packet. If the number of the packets in which the authentication error occurs is a predetermined number or greater as a result of the authentication, the encryption instruction section may determine that the first encryption has to be performed. The authentication section is, for example, the authentication data check section 223.

If the authentication errors are many, the likelihood that the denial-of-service attack (DOS attack) will occur is high. Further reducing of the denial-of-service attack can be enhanced by setting an encryption format used by the data transmission apparatus 100 to the first encryption.

Furthermore, in the data reception apparatus 200, if the number of the received redundant packets is a predetermined value or greater, the encryption instruction section may determine that the second encryption has to be performed.

If the redundant packets are many, the likelihood that the unnecessary data communication will take place is higher. Further reducing of the unnecessary decryption can be enhanced by setting the encryption format used by the data transmission apparatus 100 to the second encryption.

Furthermore, in the data reception apparatus 200, if the number of the received redundant packets is the predetermined value or greater, the encryption instruction section may determine that the first encryption has to be performed.

If the redundant packets are small in number, the likelihood that the data communication will take place with suitable redundancy is higher. Further reducing of the denial-of-service attack can be enhanced without particularly increasing the unnecessary decryption, by setting an encryption format used by the data transmission apparatus 100 to the first encryption.

Furthermore, if the reception packet is not encrypted, as a result of performing the authentication on the reception packet, when the authentication error occurs or when the reception packet is the redundant packet, the data reception apparatus 200 may perform the decryption.

Accordingly, the unnecessary decryption can be omitted, and the CPU processing load can be reduced.

Second Embodiment

A second embodiment is described. A description of details of the present embodiment that overlap with the described details of the first embodiment is omitted.

According to the present embodiment, IPsec is used in encrypting the data portion. Furthermore, the header (for example, including the UDP header or the application header) that is present within the ESP header is not encrypted without changing a position of the ESP header (for example, refer to FIG. 18).

According to the present embodiment, a packet encryption SA and a data portion encryption SA are separately established. According to the present embodiment, this is because a sequence of the headers and data included in the packet is the same as in the packet encryption and the data portion encryption (for example, refer to FIG. 18). Therefore, values of SPI are respectively set to be different in encrypting the packet and in encrypting the data portion.

The data reception apparatus 200 processes the header (IP header) in the front of the packet and the ESP header in this sequence, and determines whether a type of encryption is the packet encryption or the data portion encryption. Specifically, the data reception apparatus 200 makes a distinction between the types of encryption, based on the value of SPI included in the ESP header.

In the case of SPI indicating the packet encryption, the data reception apparatus 200 decrypts the encrypted data that follows the ESP header.

In the case of SPI indicating the data portion encryption, the data reception apparatus 200 first processes a predetermined unencrypted header following the ESP header, for example, discards the overlapping packet, and then decrypts the data portion. The predetermined header includes, for example, the UDP header, the TCP header, or the application header.

Figure 17:
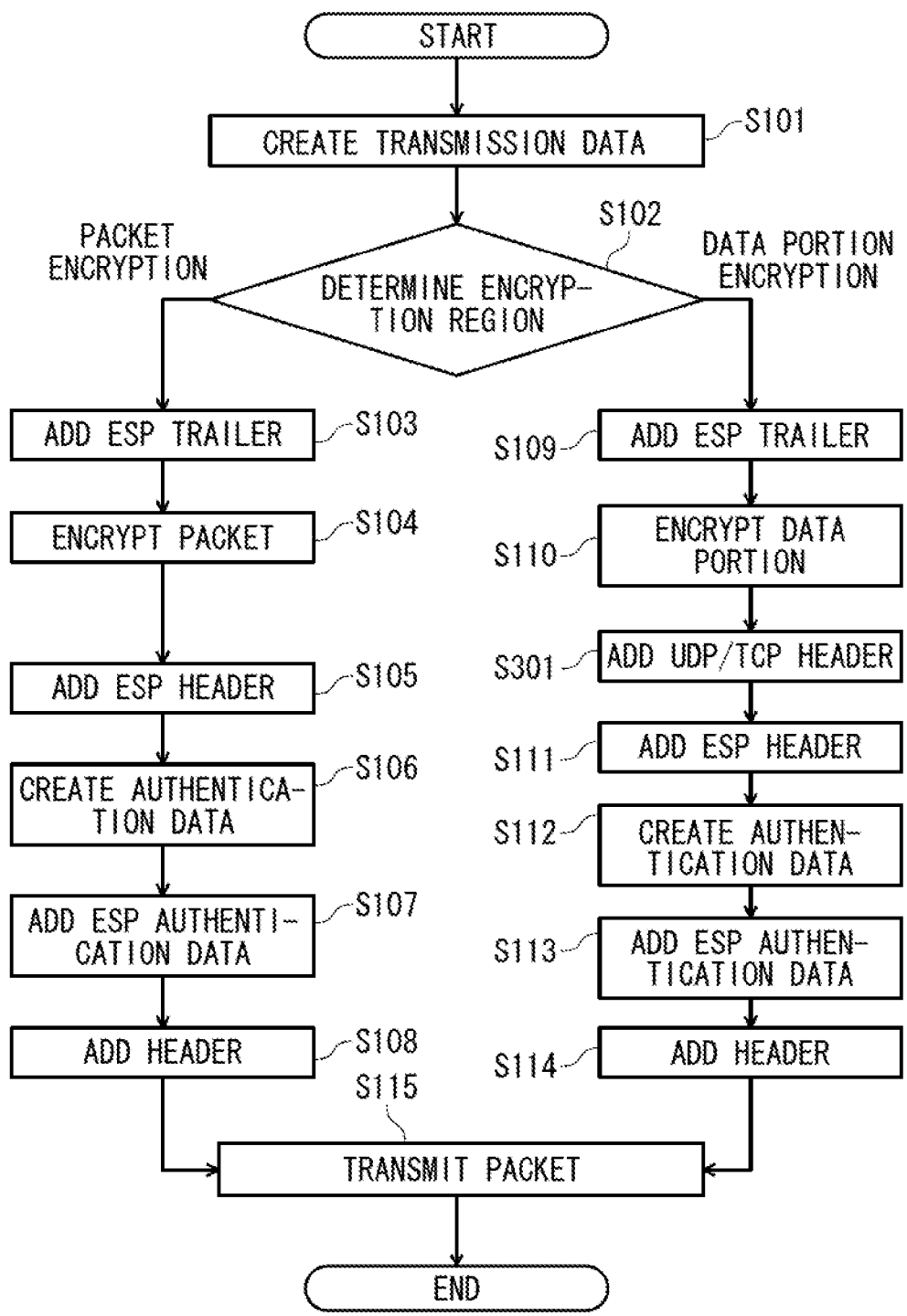
FIG. 17 is a flow chart illustrating an operational example of the transmission apparatus according to the second embodiment.

Next, an operational example of the data transmission apparatus 100 is described referring to FIG. 17. In FIG. 17, a description of the same processing as in FIG. 2 is omitted or simplified.

Because the packet encryption according to the present embodiment is the same as the packet encryption according to the first embodiment, a description of the packet encryption according to the present embodiment is omitted.

In encrypting the data portion, the data portion encryption section 171 sets padding data into the transmission data so that the size of the transmission data becomes a multiple of the block size. The data portion encryption section 171 sets the padding length information related to the padding and the protocol information following the ESP header in the ESP trailer and adds the ESP trailer to the packet (Step S109).

Subsequently, the data portion encryption section 171 performs the data portion encryption on the packet to which the ESP trailer is added (Step S110).

Subsequently, the data portion encryption section 171 adds the UDP header and the RTP header to the beginning of the encrypted data (Encrypted Data) (Step S301).

Subsequently, the data portion encryption section 171 adds the ESP header to the beginning of the UDP header (Step S111). Moreover, the data portion encryption section 171 sets length information to be described below in the ESP header.

Subsequently, the authentication data check section 173 creates the authentication data, based on the data in the integrity coverage from the ESP header to the ESP trailer (Step S112).

Subsequently, the authentication data check section 173 adds the authentication data to the data to which each header including the ESP header is added (Step S113) and adds the IP header to the beginning of the ESP header (Step S114). Accordingly, a transmission packet is completed.

Subsequently, the packet transmission section 180 transmits the completed packet (Step S115).

[Transport Mode]

Next, the transport mode is described.

Figure 18:
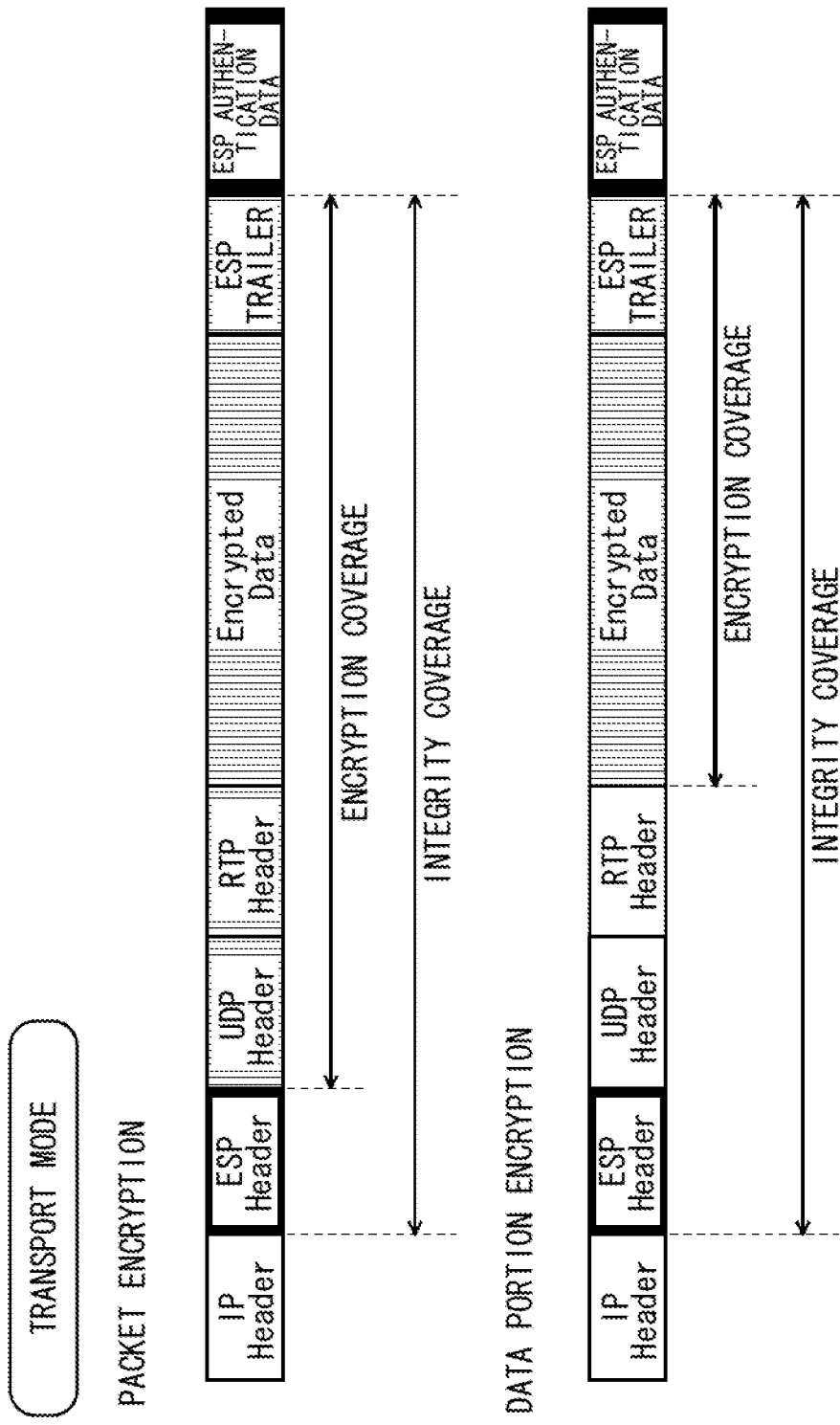
FIG. 18 is a diagram illustrating one example of a packet format of a transport mode according to the second embodiment.

FIG. 18 is a diagram illustrating one example of a packet format that is used in encrypting the packet in the transport mode and one example of the packet format that is used in encrypting the data portion in the transport mode.

Because the packet format used in encrypting the packet is the same as in the first embodiment, a description of the packet format is omitted.

Figure 19:
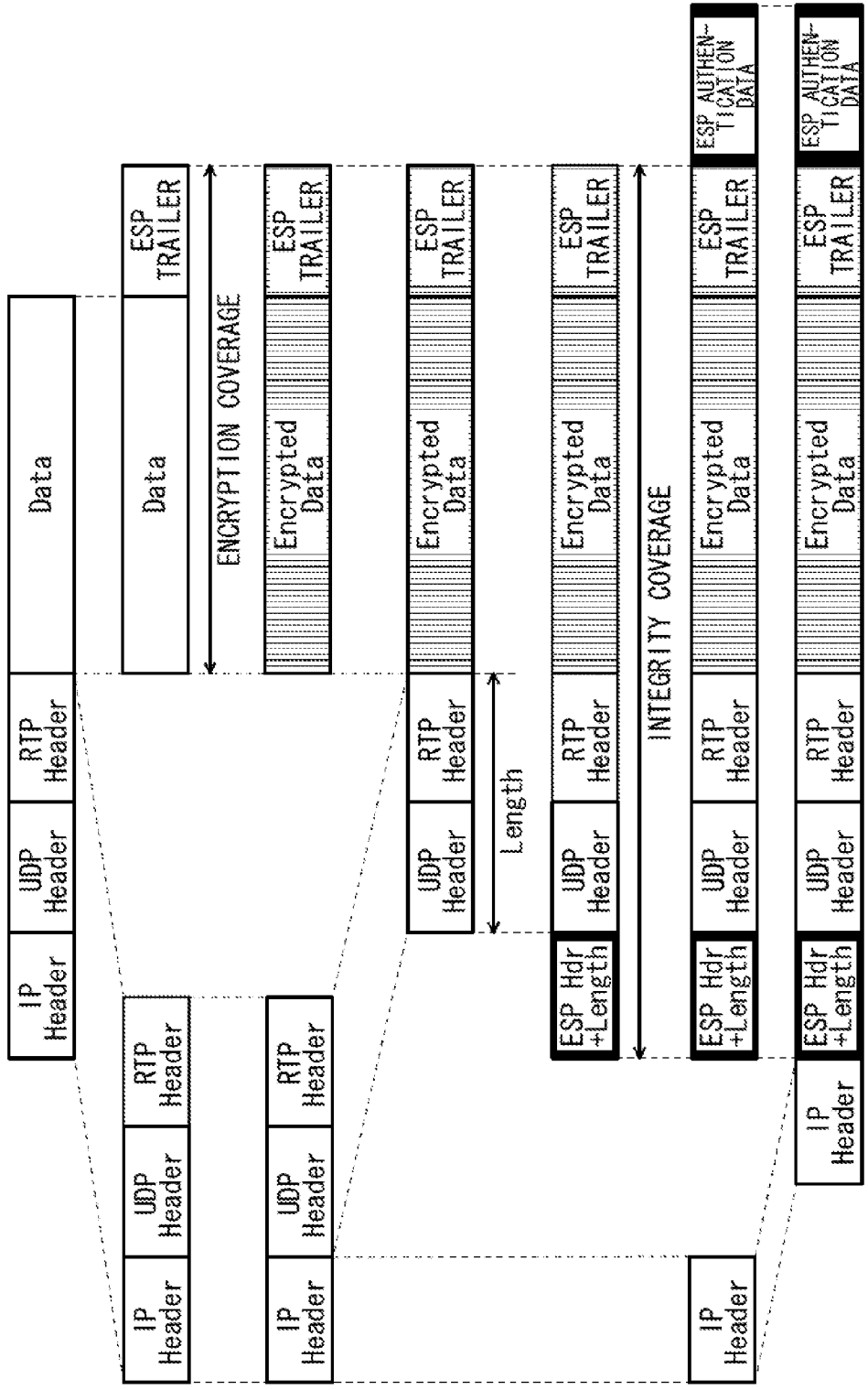
FIG. 19 is a diagram illustrating one example of data portion encryption in the transport mode according to the second embodiment.

Next, the data portion encryption in the transport mode by the data transmission apparatus 100 is described referring to FIG. 19. The processing proceeds from top to bottom in FIG. 19.

In the data transmission apparatus 100, the transmission data creation section 130 creates the transmission data (the IP packet) and the IPsec encryption section 170 inserts the ESP header between the IP header and the UDP header.

First, the IPsec encryption section 170 separates the IP header, the UDP header, and the RTP header and adds the ESP trailer to the RTP data (Data). Furthermore, the IPsec encryption section 170 sets the protocol number (17) indicating UDP in the ESP trailer protocol information.

Subsequently, the IPsec encryption section 170 encrypts the data in the encryption coverage from the RTP data to the ESP trailer. Furthermore, the IPsec encryption section 170 adds the UDP header and RTP header, which are separated, to the beginning of the encrypted data. Furthermore, the IPsec encryption section 170 adds the ESP header to the beginning of the UDP header.

In the ESP header, the IPsec encryption section 170 sets the protocol information following the ESP header in the "Next Header" and sets the length information in "Length." The length information is information indicating a length (for example, the number of bytes) from an end edge of ESP header to a position where the encryption is resumed.

The protocol number (17) indicating UDP is set in the protocol information. Furthermore, a combined length (for example, the number of bytes) of the UDP header and the RTP header is set in the length information.

Figure 20:
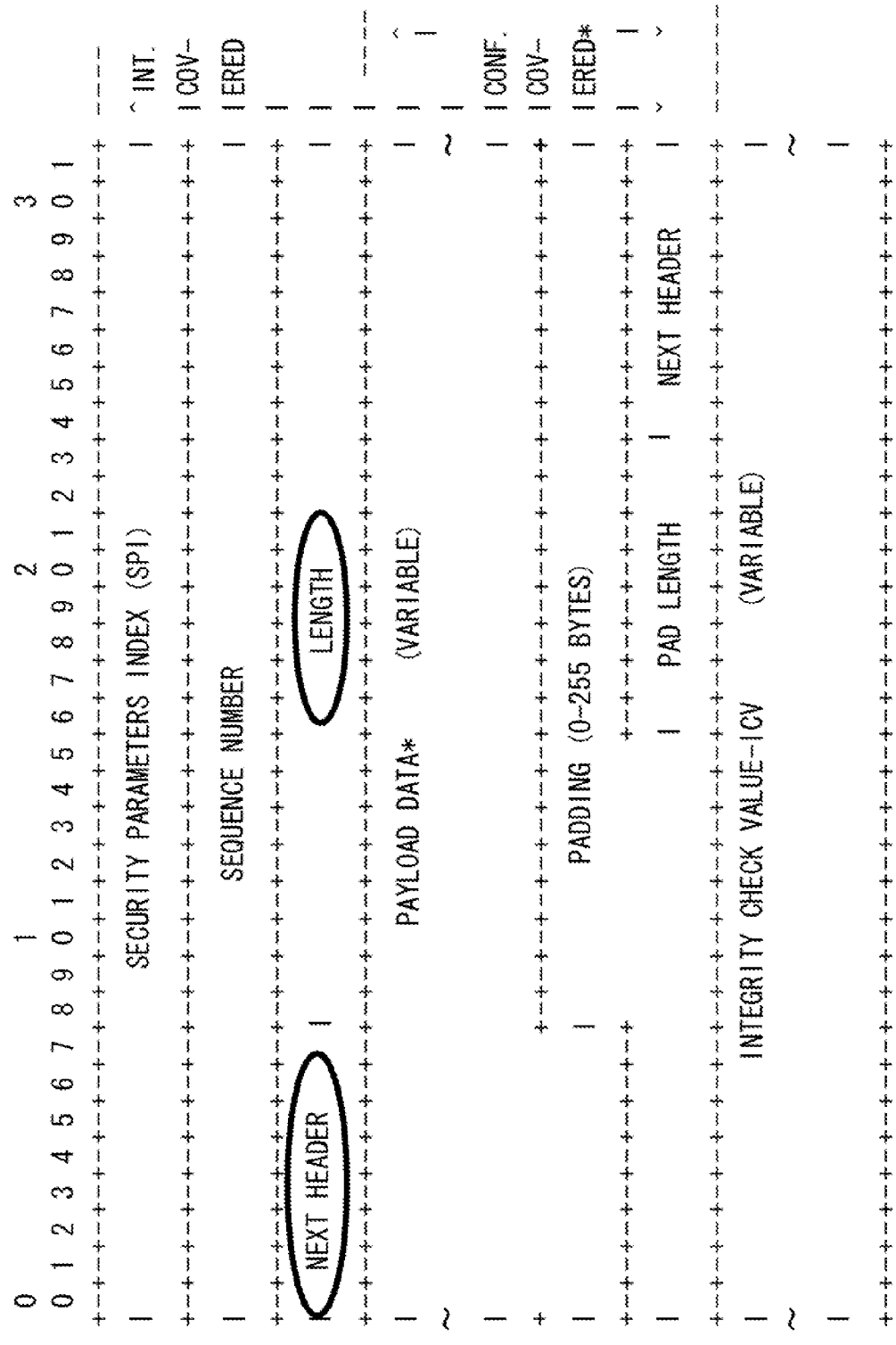
FIG. 20 is a diagram illustrating one example of an extended ESP packet format according to the second embodiment.

FIG. 20 is a diagram illustrating one example of an ESP packet format that is an extended version in which the regions "Next Header" and "Length" are added. A difference with the ESP packet format illustrated in FIG. 6 is that the "Next Header" and the "Length" are added to an ESP data region.

Subsequently, the IPsec encryption section 170 creates the authentication data, based on the data in the integrity coverage from the ESP header to the ESP trailer. The IPsec encryption section 170 adds the authentication data to the end of the encrypted data.

Subsequently, the IPsec encryption section 170 adds the IP header to the front (before the ESP header). The protocol information is included in the IP header, but initially-set protocol information (UDP) is stored within the ESP trailer. The IPsec encryption section 170 sets the ESP protocol number (50) in the IP header protocol information. Accordingly, the data-portion-encrypted IP packet is completed.

Figure 21:
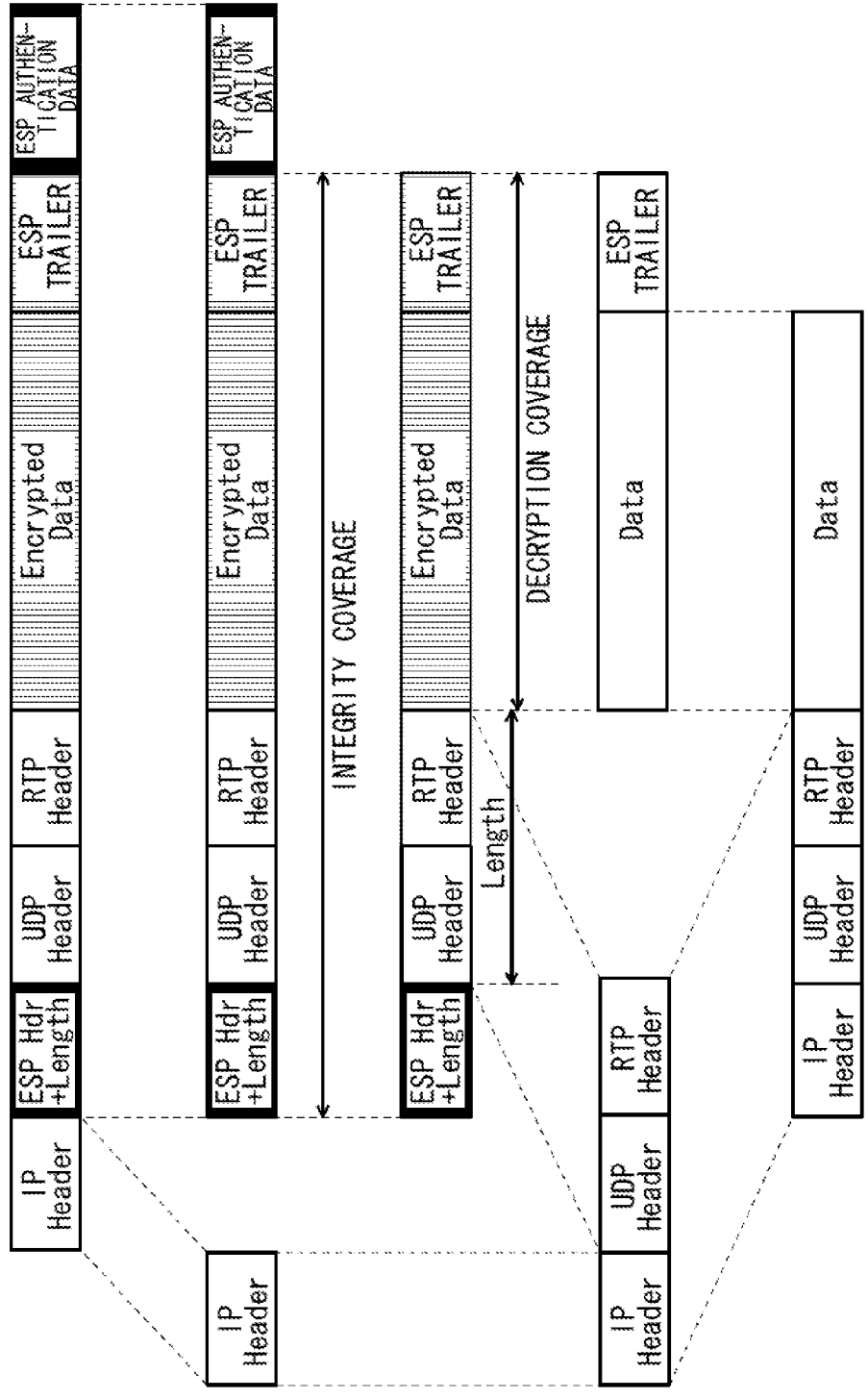
FIG. 21 is a diagram illustrating one example of data portion decryption in the transport mode according to the second embodiment.

Next, the data portion decryption in the transport mode by the data reception apparatus 200 is described referring to FIG. 21. The processing proceeds from top to bottom in FIG. 21.

In the data reception apparatus 200, the IPsec decryption section 220 generates the decrypted IP packet from the encrypted IP packet.

Because the ESP protocol number (50) is set in the protocol information that is entered in the IP header, the IPsec decryption section 220 can recognize that the ESP encryption is performed. Furthermore, with the value of SPI that is included in the ESP header, the IPsec decryption section 220 can recognize that the data portion encryption is performed. Moreover, because the protocol information following the ESP header is included in the "Next Header" of the ESP header, the IPsec decryption section 220 can recognize that the UDP packet follows.

The UDP/TCP header processing section 231 processes the UDP header. Furthermore, the application header processing section 232 specifies the application program (here, RTP) that receives the numbers, beginning with the port number that is included in the UDP header, and processes the RTP header.

Furthermore, the application header processing section 232 checks whether or not the reception packet is the overlapping packet. For example, in the case where the same RTP header as the RTP header of the previously-received packet is present, it is determined that the overlapping packet is present. The application header processing section 232 discards the packet if it is determined that the reception packet is the overlapping packet.

Subsequently, the IPsec decryption section 220 separates the ESP authentication data that is added to the end of the reception packet. The IPsec decryption section 220 creates the authentication data, based on the data in the integrity coverage from the front of the ESP header to the end of the ESP trailer.

The IPsec decryption section 220 compares the created authentication data and the authentication data added to the packet. If the created authentication data and the added authentication data are different from each other, the IPsec decryption section 220 discards the packet. Moreover, here, the example in which the UDP header and the RTP header are processed before authenticating and checking is described, but the authenticating and the checking may be performed before processing the UDP header and the RTP header.

If the created authentication data and the added authentication data are consistent with each other, the IPsec decryption section 220 performs using SPI included in the ESP header and the length information.

In this case, the IPsec decryption section 220 removes the ESP header and decrypts the data in the decryption coverage from a position at which the number of bytes designated with the length information is emptied, that is, from the front of the encrypted data (Encrypted Data) to the ESP trailer.

The IPsec decryption section 220 refers to the padding length information included in the decrypted ESP trailer and deletes the padding that is added to the rear portion of the decrypted data. Furthermore, the IPsec decryption section 220 adds the IP header, the UDP header, and the RTP header to the front of the post-decryption data (Data). Accordingly, the decrypted IP packet is completed.

[Tunnel Mode]

Next, the tunnel mode is described.

Figure 22:
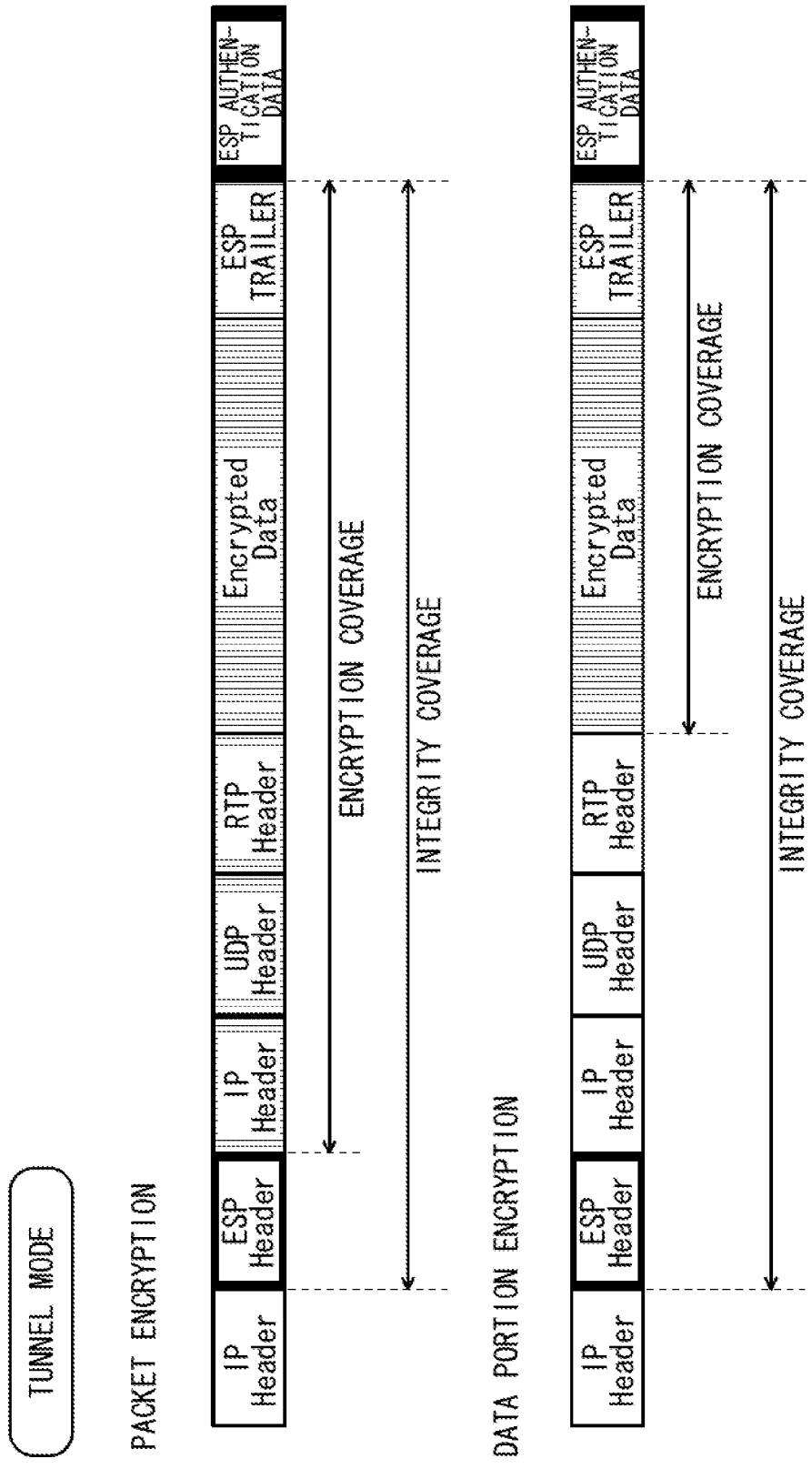
FIG. 22 is a diagram illustrating one example of a packet format in a tunnel mode according to the second embodiment.

FIG. 22 is a diagram illustrating one example of the packet format that is used in encrypting the packet in the tunnel mode and one example of the packet format that is used in encrypting the data portion in the tunnel mode.

Because the packet format used in encrypting the packet is the same as in the first embodiment, a description of the packet format is omitted.

Figure 23:
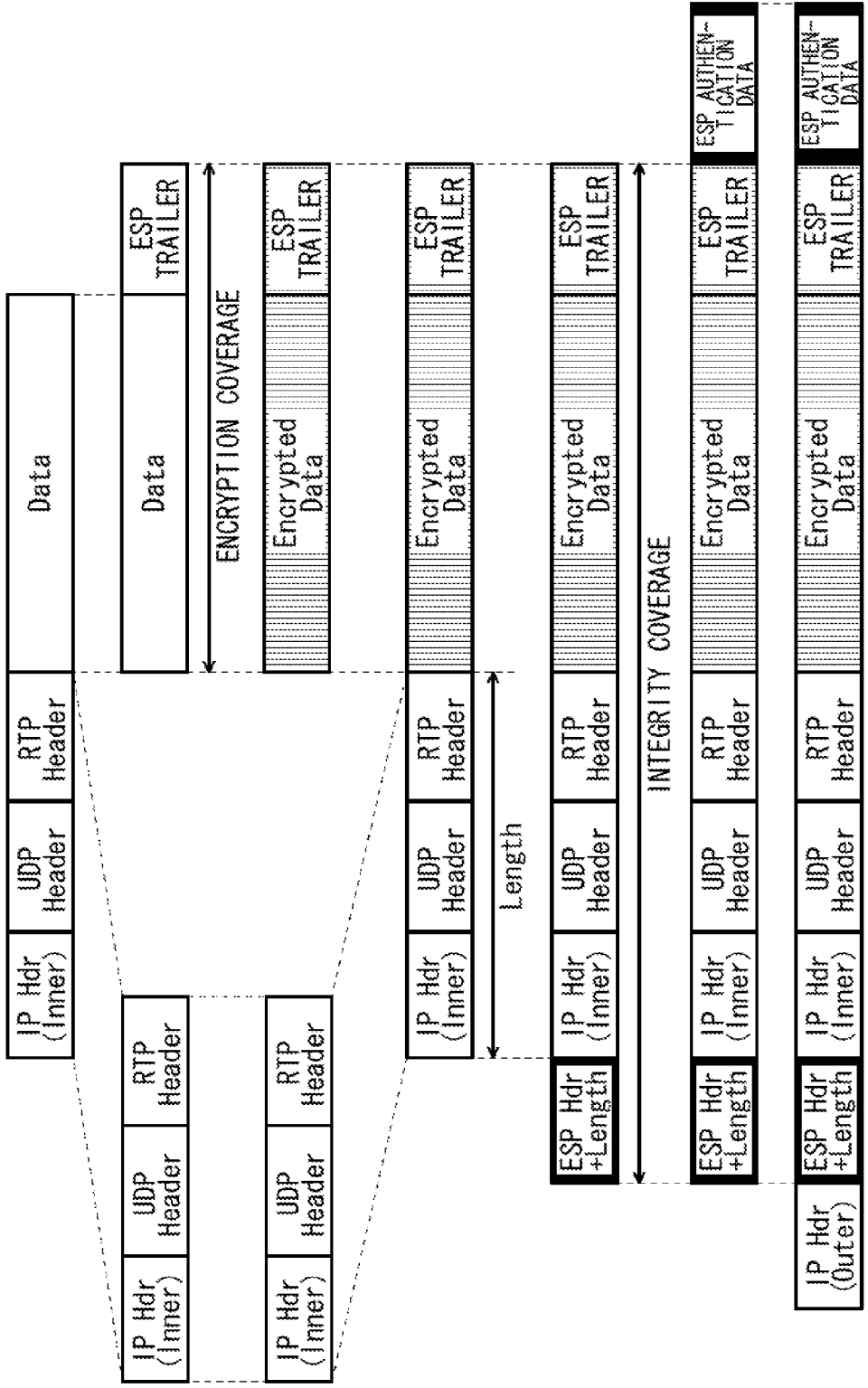
FIG. 23 is a diagram illustrating one example of data portion encryption in the tunnel mode according to the second embodiment.

Next, the data portion encryption in the tunnel mode by the data transmission apparatus 100 is described referring to FIG. 23. The processing proceeds from top to bottom in FIG. 23.

In the data transmission apparatus 100, the transmission data creation section 130 creates the transmission data (the IP packet), and the IPsec encryption section 170 adds the ESP header to the IP packet and performs the IP encapsulation.

First, the IPsec encryption section 170 separates the IP header (inner) included in the IP packet, the UDP header, and the RTP header and adds the ESP trailer to the RTP data (Data). The IPsec encryption section 170 sets a number (4) indicating the IP header in the ESP trailer protocol information.

Subsequently, the IPsec encryption section 170 encrypts the data in the encryption coverage from the RTP data (Data) to the ESP trailer. Further, the IPsec encryption section 170 adds the IP header (Inner), the UDP header, and the RTP header, which are separated, to the beginning of the RTP data. Furthermore, the IPsec encryption section 170 adds the ESP header to the beginning of the IP header (Inner).

In the ESP header, the IPsec encryption section 170 sets the protocol information in the "Next Header," and sets the length information in the "Length." The protocol number (4) indicating IP is set in the protocol information. A combined length (for example, the number of bytes) of the IP header, the UDP header and the RTP header is set in the length information.

Subsequently, the IPsec encryption section 170 creates the authentication data, based on the data in the integrity coverage from the ESP header to the ESP trailer. The IPsec encryption section 170 adds the authentication data to the end of the encrypted data.

Subsequently, the IPsec encryption section 170 adds the IP header to the front (before the ESP header). Furthermore, the IPsec encryption section 170 sets the ESP protocol number (50) in the IP header protocol information. Accordingly, the data-portion-encrypted IP packet is completed.

Figure 24:
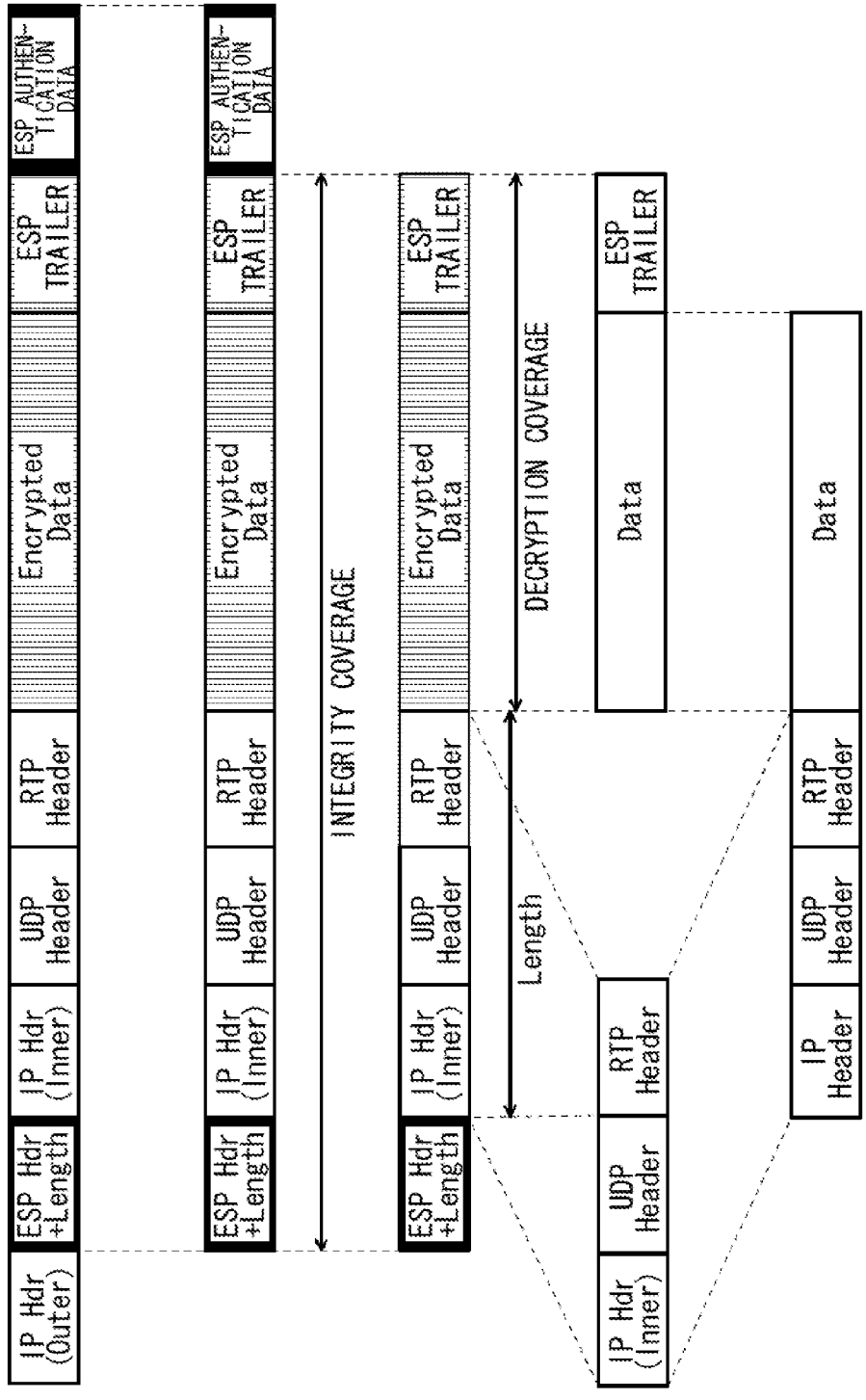
FIG. 24 is a diagram illustrating one example of data portion decryption in the tunnel mode according to the second embodiment.

Next, the data portion decryption in the transport mode by the data reception apparatus 200 is described referring to FIG. 24. The processing proceeds from top to bottom in FIG. 24.

In the data reception apparatus 200, the IPsec decryption section 220 generates the decrypted IP packet from the encrypted IP packet.

Because the ESP protocol number (50) is set in the protocol information that is entered in the IP header, the IPsec decryption section 220 can recognize that the ESP encryption is performed. Furthermore, with SPI that is included in the ESP header, the IPsec decryption section 220 can recognize that the data portion encryption is performed. Moreover, because the protocol information following the ESP header is included in the ESP header that is the extended version, the IPsec decryption section 220 can recognize that the IP packet follows.

Subsequently, the UDP/TCP header processing section 231 processes the IP header and the UDP header. Furthermore, the application header processing section 232 specifies the application program (here, RTP) that receives the numbers, beginning with the port number and processes the RTP header.

Furthermore, the application header processing section 232 checks whether or not the reception packet is the overlapping packet. The application header processing section 232 discards the packet if it is determined that the reception packet is the overlapping packet.

Subsequently, the ESP authentication data added to the end of the received data is separated. Furthermore, the IPsec decryption section 220 creates the authentication data, based on the data in the integrity coverage from the front of the ESP header to the end of the ESP trailer.

The IPsec decryption section 220 compares the created authentication data and the authentication data added to the packet. If the created authentication data and the added authentication data are different from each other, the IPsec decryption section 220 discards the packet. Moreover, here, the example in which the UDP header and the RTP header are processed before authenticating and checking is described, but the authenticating and the checking may be performed before processing the UDP header and the RTP header.

If the created authentication data and the added authentication data are consistent with each other, the IPsec decryption section 220 performs the decryption using SPI included in the ESP header and the length information.

In this case, the IPsec decryption section 220 separates the ESP header and decrypts the data in the decryption coverage from a position at which the number of bytes designated with the length information is emptied, that is, from the front of the encrypted data (Encrypted Data) to the ESP trailer.

The IPsec decryption section 220 refers to the padding length information included in the decrypted ESP trailer and deletes the padding that is added to the rear portion of the data. Furthermore, the IPsec decryption section 220 adds the IP header, the UDP header, and the RTP header to the front of the post-decryption data (Data). Accordingly, the data-portion-decrypted IP packet is completed.

In this manner, in the data transmission apparatus 100, in performing the second encryption, the encryption section may add the header, not included in the encryption coverage, to the end of the encryption header including the information on the encryption. Furthermore, the header for encryption includes information on a length from the corresponding header for encryption to the encryption coverage. The information on the length from the header for encryption to the encryption coverage is, for example, the length information.

Accordingly, because the data reception apparatus 200 can check each piece of header information before decryption, performing the unnecessary decryption can be avoided. Because the data reception apparatus 200 can recognize the length from the header for encryption to the encryption coverage, the decryption can be reliably performed.

Third Embodiment

A third embodiment is described. A description of details of the present embodiment that overlap with the described details of the first or second embodiment is omitted.

According to the present embodiment, IPsec is not used in encrypting the data portion. The data transmission apparatus 100 performs the data portion encryption using the encryption method unique to the application. Therefore, the ESP header is not added.

In the data portion decryption, the data reception apparatus 200 processes the header (the IP header) present in the front of the packet, the UDP header and the RTP header, in this sequence. Furthermore, the data reception apparatus 200 performs the data portion decryption on application data using the unique decryption method that is prescribed for every application. Furthermore, the data reception apparatus 200 performs the authentication using the unique authentication method that is prescribed for every application.

Furthermore, according to the present invention, only the packet encryption SA is established. In encrypting the data portion, the unique secure communications channel that is prescribed for every application is established.

The same method as SRTP is assumed as the encryption method unique to the application, the decryption method and the authentication method.

Figure 25:
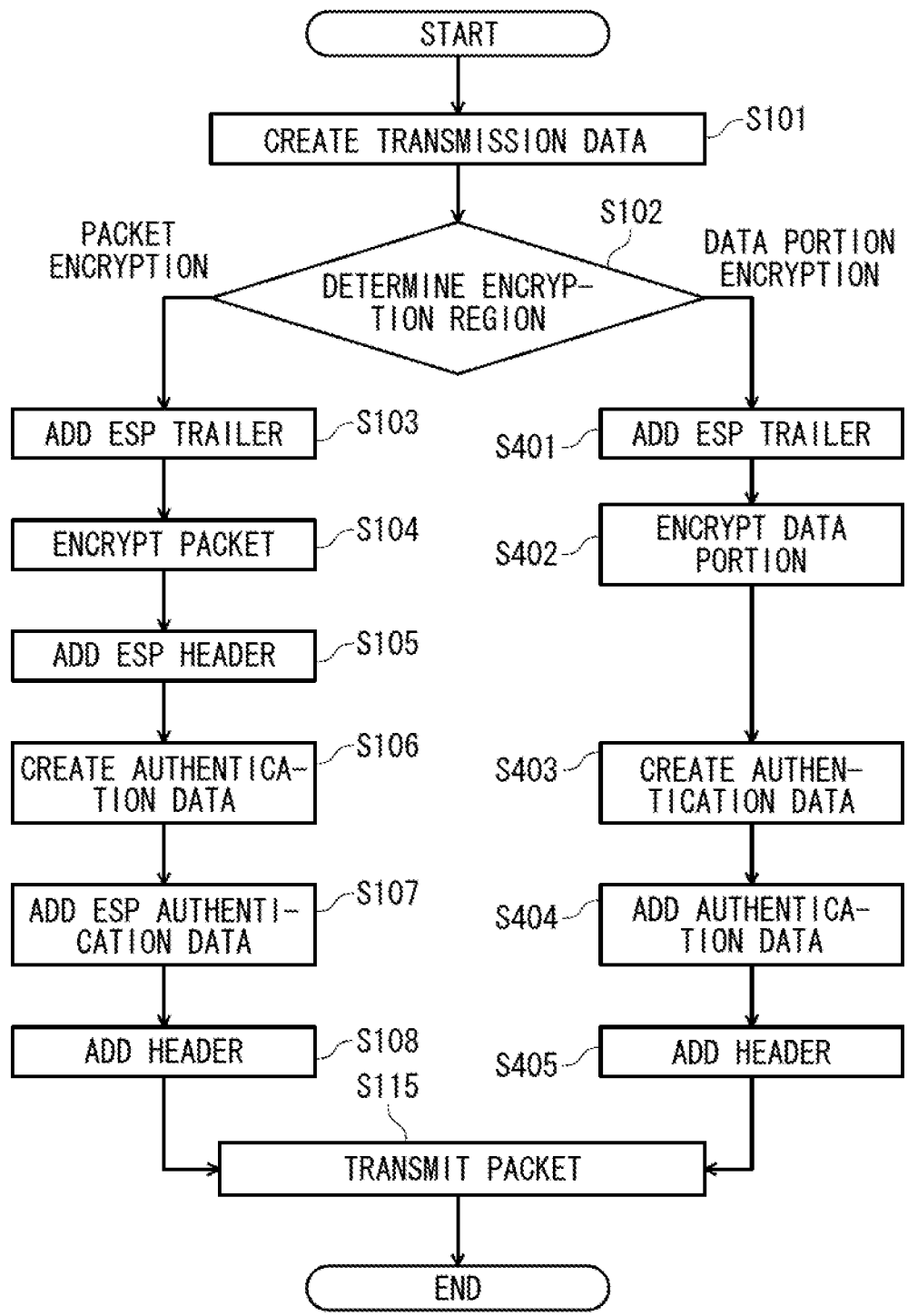
FIG. 25 is a flow chart illustrating an operational example of the data transmission apparatus according to the third embodiment.

Next, an operational example of the data transmission apparatus 100 is described referring to FIG. 25. In FIG. 25, a description of the same processing as in FIG. 2 is omitted or simplified.

Because the packet encryption according to the present embodiment is the same as the packet encryption according to the first embodiment, a description of the packet encryption according to the present embodiment is omitted.

In encrypting the data portion, the application data encryption section 120 sets padding data into the IP packet created by the transmission data creation section 130 so that the size of the IP packet becomes a multiple of the block size. The application data encryption section 120 includes the padding length information in a trailer and adds the trailer to the data (Step S401).

Subsequently, the application data encryption section 120 encrypts the data to which the trailer is added, using a predetermined encryption method that is prescribed for every application (Step S402).

Subsequently, the application data encryption section 120 creates the authentication data, based on the encrypted data (Step S403).

Subsequently, the application data encryption section 120 adds the authentication data to the end of the encrypted data (Step S404).

Subsequently the application data encryption section 120 adds the RTP header, the UDP header, and the IP header to the beginning of the encrypted data (Encrypted Data) (Step S405). Accordingly, the transmission packet is completed.

Subsequently, the packet transmission section 180 transmits the completed transmission packet (Step S115).

Figure 26:
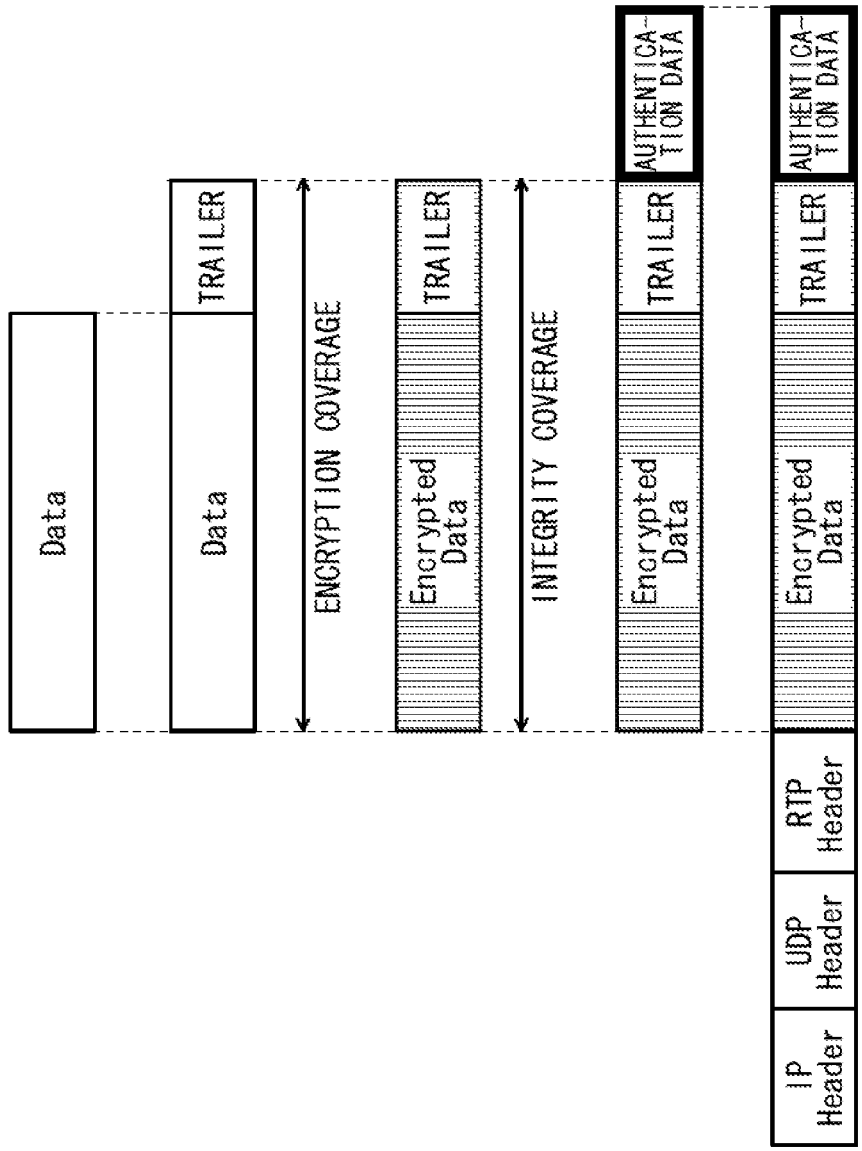
FIG. 26 is a diagram illustrating one example of data portion encryption according to the third embodiment.

Next, the data portion encryption by the data transmission apparatus 100 is described referring to FIG. 26. The processing proceeds from top to bottom in FIG. 26.

First, the application data encryption section 120 sets padding data so that the size of the data to be encrypted becomes a multiple of the block size. The application data encryption section 120 includes the padding length information in a predetermined trailer and adds the trailer to the RTP data (Data).

Subsequently, the application data encryption section 120 encrypts the data to which the predetermined trailer is added.

Subsequently, the application data encryption section 120 creates the authentication data, based on the encrypted data. Moreover, because the ESP header is not added, the encryption coverage and the integrity coverage are in the same coverage. The application data encryption section 120 adds the authentication data to the end of the encrypted data.

Subsequently, the application data encryption section 120 adds the IP header, the UDP header, and the RTP header to the beginning of the encrypted data (Encrypted Data). Accordingly, the data-portion-encrypted IP packet is completed.

Figure 27:
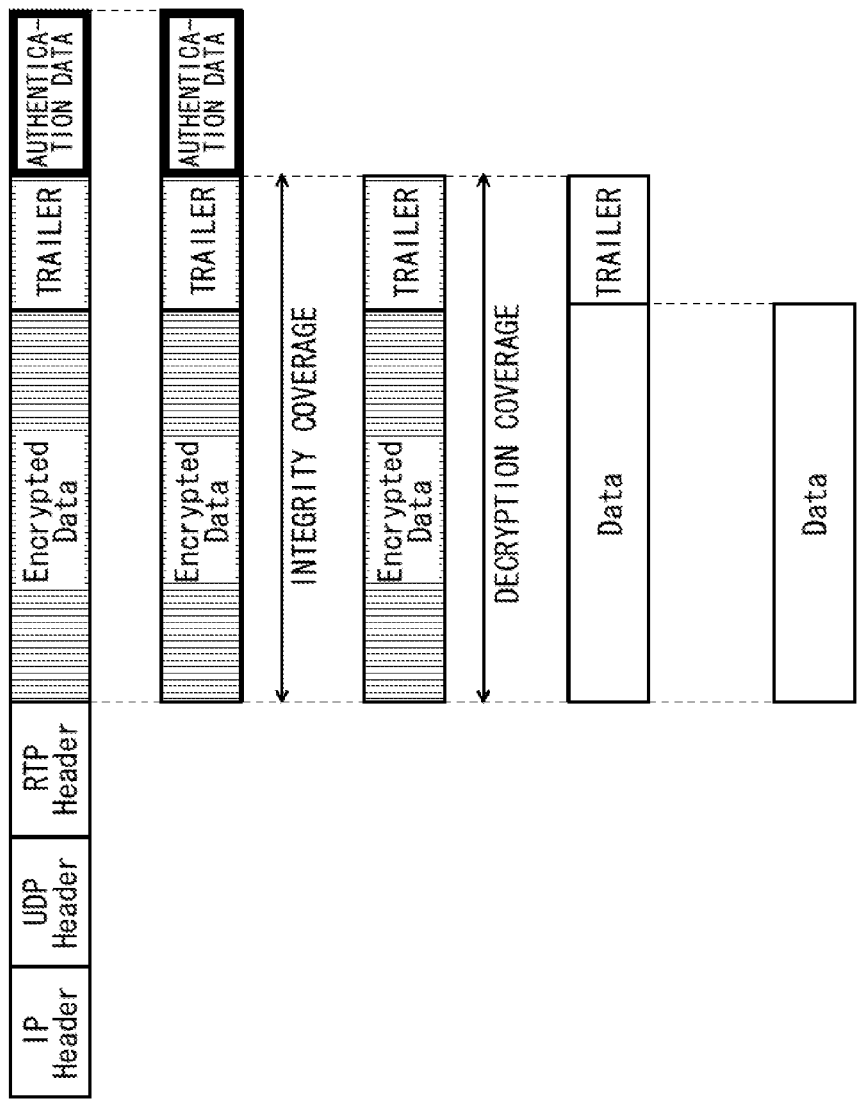
FIG. 27 is a diagram illustrating one example of the data portion decryption according to the third embodiment.

Next, the data portion decryption by the data reception apparatus 200 is described referring to FIG. 27. The processing proceeds from top to bottom in FIG. 27.

The UDP/TCP header processing section 231 processes the IP header and the UDP header. The application header processing section 232 processes the RTP header. If the reception packet is, for example, the overlapping packet that overlaps with the previously-received packet, the application header processing section 232 discards the overlapping packet.

Subsequently, the application data decryption section 280 performs the authentication using the predetermined authentication method that is prescribed for every application. The application data decryption section 280 compares the authentication data created by the authentication and the authentication data added to the packet. If the created authentication data and the added authentication data are not consistent with each other, the application data decryption section 280 discards the packet.

Subsequently, the application data decryption section 280 decrypts the data in the decryption coverage that includes the data (Encrypted Data) and a predetermined trailer, using the predetermined decryption method that is prescribed for every application. Furthermore, the application data decryption section 280 deletes the padding of the decrypted RTP data (Data) using the padding length information that is included in the decrypted predetermined trailer.

In this manner, in the data transmission apparatus 100, in performing the second encryption, the encryption section may encrypt the data portion using the encryption method that is prescribed for every application and may not add the encryption header including the information on the encryption.

In the data transmission apparatus 100, because the processing for the second encryption is performed with the application, the secure communications channel for the second encryption does not need to be established in advance in the data transmission apparatus 100 and the data reception apparatus 200, and the processing load can be reduced.

The present disclosure is not limited to the configuration of each of the embodiments described above. The present disclosure can be applied to whatever configuration can accomplish functions recited in claims, or functions performed by the configuration of each of the embodiments described above.

In each of the embodiments described above, as an example of the application, RTP is mainly described, but FEC may be possible and other applications may be possible.

Furthermore, in each of the embodiments described above, as an example of the transport layer protocol, UDP is mainly described, but TCP may be possible.

Figure 28:
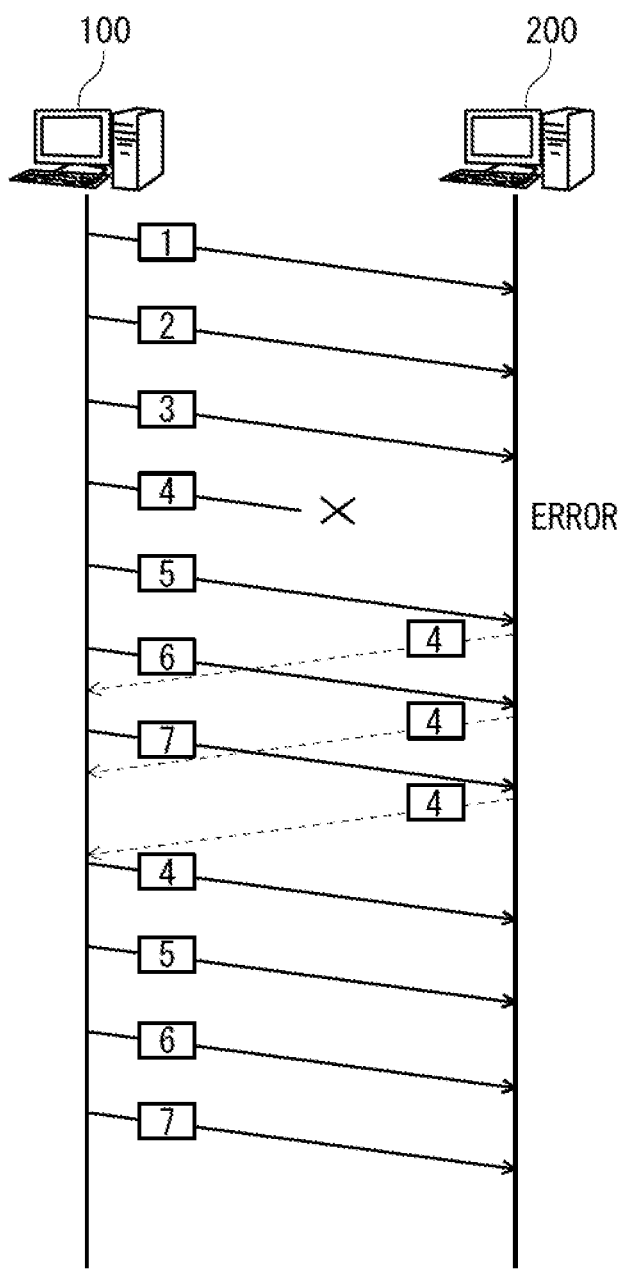
FIG. 28 is a diagram illustrating one example of a retransmission sequence using TCP according to the first to third embodiments.

FIG. 28 is a diagram illustrating a retransmission sequence using TCP. For example, if the data reception apparatus 200 does not receive a segment "4" the data transmission apparatus 100 retransmits the segment 4 and later segments (for example, segments "4" to "7"). Because of this, segments "5" to "7" are overlapping segments that are transmitted a number of multiple times with the retransmission. Because the overlapping packet is discarded, the data reception apparatus 200 can omit the unnecessary decryption even though a TCP protocol is used.

In the data transmission apparatus 100, the data reception apparatus 200, or the data communication system 1000, for example, the overlapping decryption can be canceled, the CPU load can be reduced, and the power consumption is suppressed. Therefore, the data transmission apparatus 100 or the data reception apparatus 200, for example, can be applied to a telephone set, a television set, a cable television set, a transmission apparatus on the television broadcasting side, a transmission apparatus on the radio and radio broadcasting side, or a cable broadcasting apparatus. Furthermore, the data transmission apparatus 100 or the data reception apparatus 200 can be applied to a mobile phone, a smart phone, a tablet computer, a personal computer, a communication-function-equipped camera, a communication-function-equipped video camera, or various data communication apparatuses.

Furthermore, each of the embodiments is described using an example in which the present disclosure is configured in hardware, but the present disclosure can be realized also in software in cooperation with hardware.

Furthermore, each functional block that is used in describing each of the embodiments described above is realized as an LSI that is typically an integrated circuit. The functional blocks may be provided as individual chips, or some or all of the functional blocks may be provided as integrated in a single chip. Here, the functional blocks may be provided as the LSI, and depending on differences in integration level, the LSI may be referred to as an IC, a system LSI, a super LSI, or an ultra LSI.

Furthermore, circuit integration is not limited to the LSI and may be achieved by dedicated circuitry or a general-purpose processor. For example, after fabrication of the LSI, a field-programmable gate array (FPGA), which is programmable, or a reconfigurable processor which allows reconfiguration of connections and settings of circuit cells in the LSI may be used as well.

Furthermore, if a technology of making circuits integrated appears which substitutes for the LSI by another photoresist deriving from the semiconductor technology and advances in a semiconductor technology, of course, the integration of the functional blocks may be performed using such a technology. Another possibility is an application of a biotechnology and the like.

(Outline of One Aspect of Disclosure)

The first transmission apparatus of this disclosure is configured to establish a secure communications channel between the transmission apparatus and a reception apparatus, comprising;

a packet creation section configured to create a packet;

an encryption section configured to, based on a ratio of redundant packets to the packets created by the packet creation section or on an instruction from the reception apparatus, determine an encryption coverage in the packet created by the packet creation section and encrypt data in the encryption coverage; and a transmission section configured to transmit the packet encrypted by the encryption section through the secure communications channel.

With this configuration, the unnecessary decryption can be avoided and the denial-of-service attack can be prevented.

In the second transmission apparatus of the disclosure according to the first transmission apparatus, the encryption section switches between first encryption in which substantially an entirety of the packet created by the packet creation section is encrypted and second encryption in which a data portion included in the packet created by the packet creation section is encrypted.

In the third transmission apparatus of the disclosure according to the first or second transmission apparatus, the encryption section adds a header not included in the encryption coverage to the beginning of an encryption header including information on the encryption.

In the fourth transmission apparatus of the disclosure according to the second transmission apparatus, In performing the second encryption, the encryption section adds a header not included in the encryption coverage to the end of an encryption header including information on the encryption and wherein a header for the encryption includes information on a length from a header for the corresponding encryption to the encryption coverage.

In the fifth transmission apparatus of the disclosure according to the second transmission apparatus, In performing the second encryption, the encryption section encrypts the data portion using an encryption method that is prescribed for every application and does not add an encryption header including information on the encryption.

In the sixth transmission apparatus of the disclosure according to any one of the first to fifth transmission apparatus, the packet created by the packet creation section includes a real-time transport protocol (RTP) packet, a forward error correction (FEC) packet, a transmission control protocol (TCP) packet, or an application packet.

The first reception apparatus of the disclosure is configured to establish a secure communications channel between the reception apparatus and a transmission apparatus, comprising:

a reception section configured to receive a packet through the secure communications channel; and an encryption instruction section configured to, depending on whether or not the packet received by the reception section satisfies a predetermined reference, determine an encryption coverage in which the packet created by the transmission apparatus is encrypted and instruct the transmission apparatus to encrypt data in the encryption coverage.

With this configuration, the unnecessary decryption can be avoided and the denial-of-service attack can be prevented.

In the second reception apparatus of the disclosure according to the first reception apparatus, the encryption instruction section instructs the transmission apparatus to switch between first encryption in which substantially an entirety of the packet created by the transmission apparatus is encrypted and second encryption in which a data portion included in the packet created by the transmission apparatus is encrypted.

In the third reception apparatus of the disclosure according to the second reception apparatus, If the number of the packets that are received by the reception section and are not encrypted is a predetermined number or greater, the encryption instruction section determines that the first encryption has to be performed.

The fourth reception apparatus of the disclosure according to the second reception apparatus further comprises:

an authentication section configured to authenticate the packet received by the reception section, wherein, if the number of the packets in which an authentication error occurs is a predetermined number or greater as a result of the authentication by the authentication section, the encryption instruction section determines that the first encryption has to be performed.

In the fifth reception apparatus of the disclosure according to the second reception apparatus, if the number of redundant packets received by the reception section is a predetermined value or greater, the encryption instruction section determines that the second encryption has to be performed.

In the sixth reception apparatus of the disclosure according to the second reception apparatus, if the number of redundant packets received by the reception section is below a predetermined value, the encryption instruction section determines that the first encryption has to be performed.

The seventh reception apparatus of the disclosure according to any one of the first to the sixth reception apparatus, further comprises:

a decryption section configured to decrypt the packet received by the reception section, wherein, if the packet received by the reception section is not encrypted, as a result of authenticating the packet received by the reception section, when an authentication error occurs or when the packet received by the reception section is a redundant packet, the decryption section does not perform decryption.

The first communication system of the disclosure is configured to establish a secure communications channel between a transmission apparatus and a reception apparatus, the transmission apparatus comprising:

a packet creation section configured to create a packet;

an encryption section configured to, based on a ratio of a redundant packet to the packets created by the packet creation section or on an instruction from the reception apparatus, determine an encryption coverage in the packet created by the packet creation section and encrypt data in the encryption coverage; and a transmission section configured to transmit the packet encrypted by the encryption section through the secure communications channel, the reception apparatus including a reception section configured to receive the packet through the secure communications channel, and an encryption instruction section configured to, depending on whether or not the packet received by the reception section satisfies a predetermined reference, determine an encryption coverage in which the packet created by the transmission apparatus is encrypted and instruct the transmission apparatus to encrypt data in the encryption coverage.

With this configuration, the unnecessary decryption can be avoided and the denial-of-service attack can be prevented.

The first transmission method of the disclosure for use in a transmission apparatus is configured to establish a secure communications channel between the transmission apparatus and a reception apparatus, the method comprising:

a step of creating a packet;

a step of determining an encryption coverage in the packet created by the packet creation section and encrypting data in the encryption coverage, based on a ratio of a redundant packet to the packets created by the packet creation section and on an instruction from the reception apparatus; and a step of transmitting the encrypted packet through the secure communications channel.

With this method, the unnecessary decryption can be avoided and the denial-of-service attack can be prevented.

The first reception method for use in a reception apparatus of the disclosure is configured to establish a secure communications channel between the reception apparatus and a transmission apparatus, the method comprising:

a step of receiving a packet through the secure communications channel; and a step of determining an encryption coverage in which the packet created by the transmission apparatus is encrypted and instructing the transmission apparatus to encrypt data in the encryption coverage, depending on whether or not the packet received by the reception section satisfies a predetermined reference.

With this method, the unnecessary decryption can be avoided and the denial-of-service attack can be prevented.

While the present invention has been described in detail, or with reference to the specific embodiments, it is apparent for those skilled in the art that the invention may be modified and changed in various manners without departing from the scope and spirit of the invention.

The present application is based on Japanese Patent Application No. 2012-122363 filed on May 29, 2012, the entire content of which is incorporated by reference herein.

INDUSTRIAL APPLICABILITY

The disclosure is useful in a transmission apparatus, a reception apparatus, a communication system, a transmission method, a reception method and the like that can avoid the unnecessary encryption and prevent the denial-of-service attack.

REFERENCE SIGNS LIST

1000 DATA COMMUNICATION SYSTEM
100 DATA TRANSMISSION APPARATUS
110 TRANSMITTING-SIDE APPLICATION MANAGEMENT SECTION
120 APPLICATION DATA ENCRYPTION SECTION
130 TRANSMISSION DATA CREATION SECTION
140 OVERLAPPING INFORMATION CHECK SECTION
150 SWITCHING INSTRUCTION RECEPTION SECTION
160 ENCRYPTION REGION DETERMINATION SECTION
170 IPsec ENCRYPTION SECTION
171 DATA PORTION ENCRYPTION SECTION
172 PACKET ENCRYPTION SECTION
173 AUTHENTICATION DATA LOAD PROCESSING SECTION
174 SAD
175 SPD
180 PACKET TRANSMISSION SECTION
200 DATA RECEPTION APPARATUS
210 PACKET RECEPTION SECTION
220 IPsec DECRYPTION SECTION
221 DATA PORTION DECRYPTION SECTION
222 PACKET DECRYPTION SECTION
223 AUTHENTICATION DATA CHECK SECTION
224 SAD
225 SPD
231 UDP/TCP HEADER PROCESSING SECTION
232 APPLICATION HEADER PROCESSING SECTION
241 NUMBER-OF-RECEPTION-ERROR-PACKETS COUNT SECTION
242 NUMBER-OF-AUTHENTICATION-ERROR-PACKETS COUNT SECTION
243 NUMBER-OF-OVERLAPPING-PACKETS COUNT SECTION
250 ENCRYPTION REGION SWITCHING DETERMINATION SECTION
260 SWITCHING INSTRUCTION TRANSMISSION SECTION
270 RECEIVING-SIDE APPLICATION MANAGEMENT SECTION
280 APPLICATION DATA DECRYPTION SECTION
300 NETWORK

The invention claimed is:

1. A transmission apparatus configured to establish a secure communications channel between the transmission apparatus and a reception apparatus, comprising;
a packet creation section configured to create a packet;
an encryption section configured to, based on a ratio of redundant packets to the packets created by the packet creation section or on an instruction from the reception apparatus, determine an encryption coverage in the packet created by the packet creation section and encrypt data in the encryption coverage; and
a transmission section configured to transmit the packet encrypted by the encryption section through the secure communications channel.

2. The transmission apparatus according to claim 1, wherein the encryption section switches between first encryption in which substantially an entirety of the packet created by the packet creation section is encrypted and second encryption in which a data portion included in the packet created by the packet creation section is encrypted.

3. The transmission apparatus according to claim 1, wherein the encryption section adds a header not included in the encryption coverage to the beginning of an encryption header including information on the encryption.

4. The transmission apparatus according to claim 2, wherein in performing the second encryption, the encryption section adds a header not included in the encryption coverage to the end of an encryption header including information on the encryption and
wherein a header for the encryption includes information on a length from a header for the corresponding encryption to the encryption coverage.

5. The transmission apparatus according to claim 2, wherein in performing the second encryption, the encryption section encrypts the data portion using an encryption method that is prescribed for every application and does not add an encryption header including information on the encryption.

6. The transmission apparatus according to claim 1, wherein the packet created by the packet creation section includes a real-time transport protocol (RTP) packet, a forward error correction (FEC) packet, a transmission control protocol (TCP) packet, or an application packet.

7. A reception apparatus configured to establish a secure communications channel between the reception apparatus and a transmission apparatus, comprising:
a reception section configured to receive a packet through the secure communications channel; and
an encryption instruction section configured to, depending on whether or not the packet received by the reception section satisfies a predetermined reference, determine an encryption coverage in which the packet created by the transmission apparatus is encrypted and instruct the transmission apparatus to encrypt data in the encryption coverage,
wherein the predetermined reference is based on a number of redundant packets received by the reception section.

8. The reception apparatus according to claim 7, wherein the encryption instruction section instructs the transmission apparatus to switch between first encryption in which substantially an entirety of the packet created by the transmission apparatus is encrypted and second encryption in which a data portion included in the packet created by the transmission apparatus is encrypted.

9. The reception apparatus according to claim 8, wherein, if the number of the packets that are received by the reception section and are not encrypted is a predetermined number or greater, the encryption instruction section determines that the first encryption has to be performed.

10. The reception apparatus according to claim 8 further comprising:
an authentication section configured to authenticate the packet received by the reception section,
wherein, if the number of the packets in which an authentication error occurs is a predetermined number or greater as a result of the authentication by the authentication section, the encryption instruction section determines that the first encryption has to be performed.

11. The reception apparatus according to claim 8, wherein, if the number of redundant packets received by the reception section is a predetermined value or greater, the encryption instruction section determines that the second encryption has to be performed.

12. The reception apparatus according to claim 8, wherein, if the number of redundant packets received by the reception section is below a predetermined value, the encryption instruction section determines that the first encryption has to be performed.

13. The reception apparatus according to claim 7, further comprising:
a decryption section configured to decrypt the packet received by the reception section,
wherein, if the packet received by the reception section is not encrypted, as a result of authenticating the packet received by the reception section, when an authentication error occurs or when the packet received by the reception section is a redundant packet, the decryption section does not perform decryption.

14. A communication system configured to establish a secure communications channel between a transmission apparatus and a reception apparatus, the transmission apparatus comprising:
a packet creation section configured to create a packet;
an encryption section configured to, based on a ratio of a redundant packet to the packets created by the packet creation section or on an instruction from the reception apparatus, determine an encryption coverage in the packet created by the packet creation section and encrypt data in the encryption coverage; and
a transmission section configured to transmit the packet encrypted by the encryption section through the secure communications channel,
the reception apparatus including
a reception section configured to receive the packet through the secure communications channel, and
an encryption instruction section configured to, depending on whether or not the packet received by the reception section satisfies a predetermined reference, determine an encryption coverage in which the packet created by the transmission apparatus is encrypted and instruct the transmission apparatus to encrypt data in the encryption coverage.

15. A transmission method for use in a transmission apparatus configured to establish a secure communications channel between the transmission apparatus and a reception apparatus, the method comprising:
a step of creating a packet;
a step of determining an encryption coverage in the packet created by the packet creation section and encrypting data in the encryption coverage, based on a ratio of a redundant packet to the packets created by the packet creation section and on an instruction from the reception apparatus; and
a step of transmitting the encrypted packet through the secure communications channel.

16. A reception method for use in a reception apparatus configured to establish a secure communications channel between the reception apparatus and a transmission apparatus, the method comprising:
a step of receiving a packet through the secure communications channel; and
a step of determining an encryption coverage in which the packet created by the transmission apparatus is encrypted and instructing the transmission apparatus to encrypt data in the encryption coverage, depending on whether or not the packet received by the reception section satisfies a predetermined reference,
wherein the predetermined reference is based on a number of redundant packets received by the reception apparatus.

* * * * *